United States Patent
Marohl et al.

(10) Patent No.: US 9,595,907 B2
(45) Date of Patent: *Mar. 14, 2017

(54) SYSTEM AND METHOD FOR CONTROLLING MODULATION OF AN INVERTER

(71) Applicant: DEERE & COMPANY, Moline, IL (US)

(72) Inventors: Christopher L Marohl, Fargo, ND (US); David Holmburg, Fargo, ND (US); Anthony Weber, West Fargo, ND (US); Long Wu, Fargo, ND (US); Jared Lervik, Fargo, ND (US)

(73) Assignee: DEERE & COMPANY, Moline, IL (US)

( * ) Notice: Subject to any disclaimer, the term of this patent is extended or adjusted under 35 U.S.C. 154(b) by 119 days.

This patent is subject to a terminal disclaimer.

(21) Appl. No.: 14/290,189

(22) Filed: May 29, 2014

(65) Prior Publication Data
US 2015/0280619 A1 Oct. 1, 2015

Related U.S. Application Data

(60) Provisional application No. 61/971,575, filed on Mar. 28, 2014.

(51) Int. Cl.
*H02P 1/04* (2006.01)
*H02P 3/00* (2006.01)
*H02P 27/08* (2006.01)

(52) U.S. Cl.
CPC .................. *H02P 27/085* (2013.01)

(58) Field of Classification Search
CPC ........ H02P 26/002; H02P 27/06; H02P 27/08; H02P 27/085
(Continued)

(56) References Cited

U.S. PATENT DOCUMENTS 6,023,417 A * 2/2000 Hava ................. H02M 7/53875
318/811
6,710,564 B2 3/2004 Shibuya et al.
(Continued)

OTHER PUBLICATIONS

Bhavani, J.; Amarnath, J.; and Subba Rayudu, D. Performance of Direct Torque Controlled Induction Motor Drives using the only Sampled Voltages With Generalized PWM algorithm. International Journal of Systems, Algorithms & Applications. vol. 2, Issue ICRASE12, Nov. 2012.
(Continued)

*Primary Examiner* — Eduardo Colon Santana
*Assistant Examiner* — Gabriel Agared

(57) ABSTRACT

A current measurement module is adapted to measure an observed current level for the inverter. A data processor or mode controller accesses a stored representation of first current level versus rotor speed output at which a total harmonic distortion level is less than threshold total harmonic distortion level. The data processor or mode controller enables the inverter to use SVPWM (space vector pulse width modulation) if the observed current level is less than the first current level for the measured or determined rotor speed. Further, the data processor or mode controller enables the inverter to use DPWM (discontinuous pulse width modulation) if the observed current level is greater than or equal to the first current level for the measured or determined rotor speed.

20 Claims, 21 Drawing Sheets

(58) Field of Classification Search
USPC .......................................... 318/400.17, 503
See application file for complete search history.

(56) References Cited

U.S. PATENT DOCUMENTS

| | | | | |
|---|---|---|---|---|
| 8,456,115 | B2* | 6/2013 | Wu | ............. H02P 6/14 318/400.13 |
| 2009/0069142 | A1* | 3/2009 | Welchko | ............ B60K 6/445 475/276 |
| 2010/0219780 | A1* | 9/2010 | Morimoto | ............ H02P 21/06 318/400.02 |
| 2013/0307449 | A1* | 11/2013 | Kobayashi | ............ B60K 6/48 318/400.02 |
| 2014/0070755 | A1* | 3/2014 | Baek | ............ H02P 27/08 318/798 |
| 2014/0100701 | A1* | 4/2014 | Hakumura | ............ B60L 11/14 700/280 |
| 2014/0197765 | A1* | 7/2014 | Kim | ............ H02P 29/0038 318/400.2 |
| 2014/0265975 | A1* | 9/2014 | Holmes | ............ B60L 15/20 318/452 |
| 2014/0268954 | A1* | 9/2014 | Wei | ............ H02M 7/217 363/89 |
| 2014/0306638 | A1* | 10/2014 | Wu | ............ H02P 27/08 318/504 |
| 2015/0185095 | A1* | 7/2015 | Wu | ............ H02P 21/148 73/862.08 |

OTHER PUBLICATIONS

Ün, Emre and Hava, Ahmet M. Performance Characteristics of the Reduced Common Mode Voltage Near State PWM Method. Middle East Technical University, EPE 2007, Aalborg.

Nisha, G. K.; Ushakumari, S.; and Lakaparampil, Z.V. Online Harmonic Elimination of SVPWM for Three Phase Inverter and a Systematic Method for Practical Implementation. IAENG International Journal of Computer Science, 39:2, IJCS_39_2_10, published May 26, 2012.

Kumar, K. Vinoth; Michael, Prawin Angel; John, Joseph P.; and Kumar, S. Suresh. Simulation and Comparison of SPWM and SVPWM Control for Three Phase Inverter. Asian Research Publishing Network Journal of Engineering and Applied Sciences, vol. 5, No. 7, Jul. 2010.

* cited by examiner

US 9,595,907 B2

SYSTEM AND METHOD FOR CONTROLLING MODULATION OF AN INVERTER

RELATED APPLICATION

This document (including the drawings) claims priority and the benefit of the filing date based on U.S. provisional application No. 61/971,575, filed Mar. 28, 2014 under 35 U.S.C. §119 (e), where the provisional application is hereby incorporated by reference herein.

FIELD OF INVENTION

This invention relates to a method and system for controlling modulation of an inverter.

BACKGROUND

Although space vector pulse width modulation (SVPWM) can provide better current regulation than discontinuous pulse width modulation (DPWM) during certain operating modes, SVPWM typically results in higher switching losses, which tends to reduce inverter capacity, efficiency and reliability. In contrast, DPWM provides lower switching losses, which can support improved inverter power or current capacity. However, DPWM can have a negative impact on current regulation that tends to decrease the efficiency and reliability of the electric motor. Thus, there is a need for a method and system for controlling an inverter with improved pulse width modulation selection to facilitate realization of at least one of increased system capacity, efficiency, or reliability, or any combination thereof.

SUMMARY

In one embodiment, the a method and system for controlling modulation (e.g., pulse width modulation mode) of an inverter comprises a sensor (e.g., resolver, encoder or position sensor) for measuring or determining a rotor speed of a motor coupled to the inverter. A current measurement module is adapted to measure an observed current level for the inverter. A data processor or mode controller accesses a stored representation of first current level versus rotor speed output at which a total harmonic distortion level is less than threshold total harmonic distortion level. The data processor or mode controller enables the inverter to use SVPWM (space vector pulse width modulation) if the observed current level is less than the first current level for the measured or determined rotor speed. Further, the data processor or mode controller enables the inverter to use DPWM (discontinuous pulse width modulation) if the observed current level is greater than or equal to the first current level for the measured or determined rotor speed.

BRIEF DESCRIPTION OF THE DRAWINGS

Like reference numbers in different drawings indicate like elements, steps or procedures.

DETAILED DESCRIPTION

Figure 1:
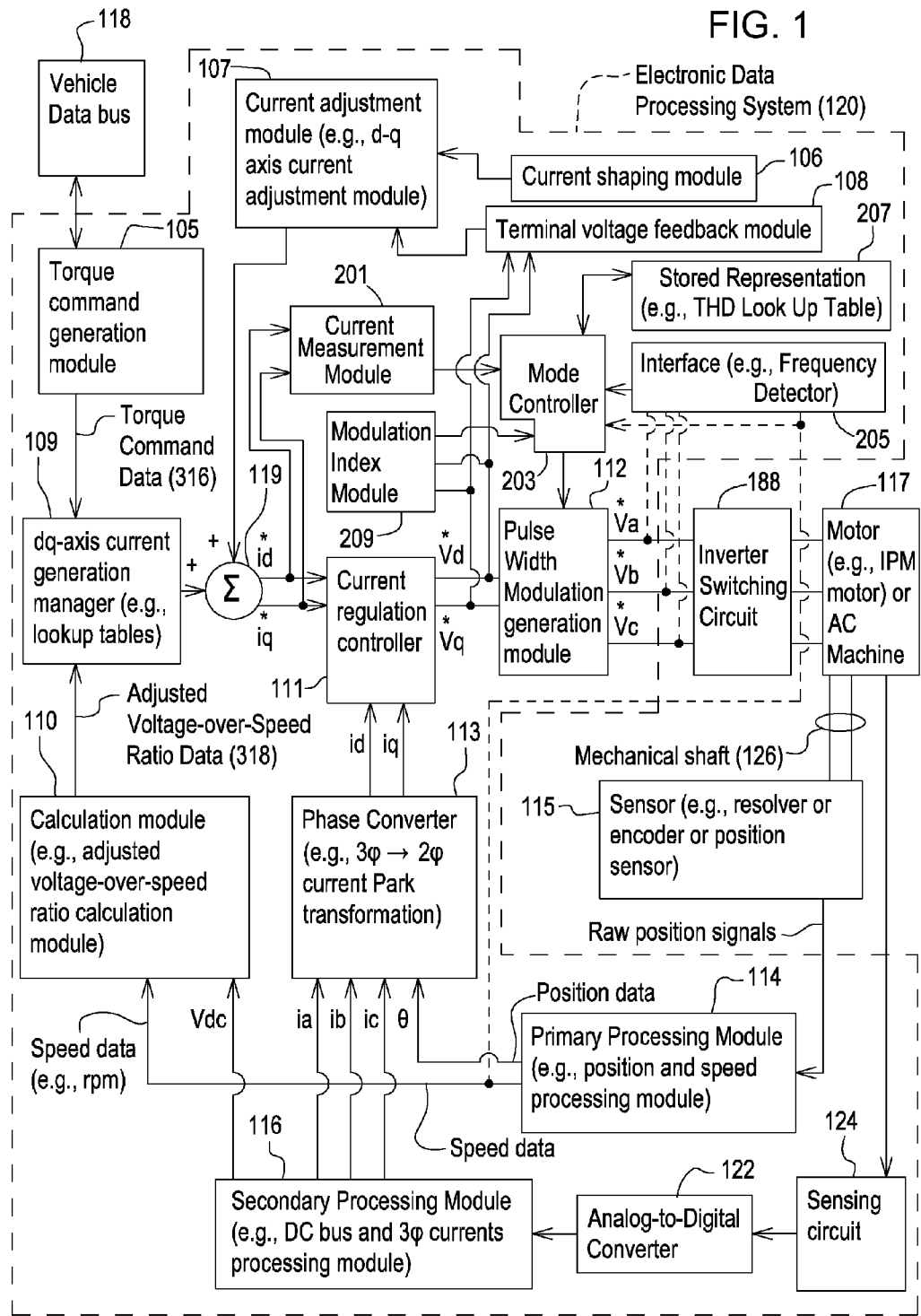
FIG. 1 is a block diagram of one embodiment of a system for controlling a modulation mode of an inverter or a transition between a SVPWM mode and DPWM mode.

In accordance with one embodiment, FIG. 1 illustrates a block diagram of a system for controlling modulation (e.g., a pulse width modulation mode) of an inverter or controlling a transition between a SVPWM (space vector pulse width modulation) mode and a DPWM (discontinuous pulse width modulation) mode. The system is well-suited for controlling selection of a modulation mode, transition between modulation modes, or both. In one embodiment, DPWM generally refers to latching or clamping of a single phase (out of multiple phases) of the inverter output or inverter switching circuit during a defined time period (e.g., a percentage, portion or faction of a switching period or an entire switching period). For example, DPWM may latch a low-side semiconductor switch or a high-side semiconductor switch of any phase (of the inverter switching section) for a defined time period, or to form pulses that are temporally spaced and that have different pulse widths. In the DPWM mode, the above latching may latch a phase in an on-state or high logic level of an inverter PWM output signal for a first time period to increase the pulse width of a signal at a phase output of the inverter compared to the pulse widths of one or more other phases of the inverter over a second time period, where the second time period is greater than the first time period. Conversely, in the DPWM mode, the above latching may latch a phase in an off-state, zero-state or low logic level of the inverter PWM output signal to decrease or eliminate the pulse width of a signal at phase output of the inverter compared to other phases of the inverter. Further, in certain embodiments, DPWM uses only one possible off-state or zero state of phase output of the multiple phases at a time, as opposed to two possible zero states or off-states for SVPWM.

In one example of the DPWM mode, the inverter or data processor 264 can latch a phase of the inverter switching circuit in the on-state. In particular, the inverter or data processor 264 can latch its low-side semiconductor or its high-side semiconductor of the phase within the inverter switching circuit in the on-state, where the voltage magnitude of that phase is at a near a peak amplitude. The low-side semiconductor means its switched terminal (e.g., drain, source, emitter or collector) is coupled to the low or negative direct current terminal, whereas the high-side semiconductor means its switched terminal is coupled to the high or positive direct current terminal. In another example of the DPWM mode, the inverter or data processor 264 latches a phase in the inverter switching circuit dependent upon a sector of operation in a direct-quadrature (d-q) axis representation to promote efficiency improvement with respect to a lagging power factor. In certain circumstances or ideally, DPWM can reduce switching losses, improve inverter efficiency, increase inverter current capability and enhance inverter system reliability.

In one embodiment, SVPWM transforms or maps output voltages (e.g., instantaneous output voltages) of the inverter to a d-q representation, reference plane or another suitable reference plane. With respect to the d-q reference plane, SVPWM requires angle and sector information associated with voltages of each phase to generate gate control times and corresponding signals phase command voltages (e.g., $V_a^*$, $V_b^*$, $V_c^*$) for the inverter switching circuit, a pulse width modulation generation module 112, or a driver for the inverter switching circuit. In one embodiment of SVPWM, if a high-side semiconductor switch (of the inverter switching circuit) is on, the corresponding low-side semiconductor switch is off such that the high-side semiconductor switch can contribute toward a resultant output voltage, where SVPWM varies the switching sequence of the high-side semiconductor switches in a particular sequence or order to facilitate the reduction or elimination of total harmonic distortion at the output of the inverter switching circuit. In general, SVPWM may select non-zero d-q vectors (e.g., one or more high-side semiconductor switches of the inverter phases) and zero d-q vectors (e.g., one or more low-side semiconductor switches of the inverter phases) for time intervals (e.g., a percentage, fraction or portion) of the switching period required to create or match (e.g., precisely in magnitude and temporally/phase aligned) a target output signals at the inverter phases. Under certain conditions or ideally, SVPWM is well-suited for maximizing an output voltage of a fundamental frequency component, while minimizing total harmonic distortion at the inverter output.

In general, the data processing system 120, data processor 264 or mode controller supports transitioning the inverter from an existing operational mode to a new operational mode, where the existing operational mode and the new operational mode are selected from the group of operating modes consisting of SVPWM and DPWM based on the determined fundamental frequency, an estimated THD level associated with a stored representation for a corresponding current and fundamental frequency, and the observed modulation index.

In certain embodiments, the system or method for controlling modulation (e.g., pulse width modulation module) of the inverter can use one or more of the following factors to select an appropriate pulse width modulation mode between SVPWM and DPWM or to transition between SVPWM and DPWM: (1) a total harmonic distortion factor associated with an observed current level at a corresponding fundamental frequency of one or more phases of the inverter output or a corresponding rotor speed of the motor coupled to the inverter; (2) an observed modulation index associated with measurements (e.g., voltage levels, current levels, pulse duration and/or duty cycle) of one or more output phase signals or precursor signals (e.g., driver signals or gate/base signals for power switching semiconductors of the inverter); (3) an observed fundamental frequency fundamental frequency (e.g., versus a minimum or threshold fundamental frequency) of one or more phases of the inverter output or a corresponding rotor speed (e.g., versus a minimum or threshold rotor speed) of the motor coupled to the inverter; (4) a hysteresis factor to delay, inhibit or postpone one or more transitions between modes (e.g., between SVPWM and DPWM to avoid rapid or inefficient oscillation between modes) based on if-then rules, other parameters, or various algorithms. The above factors can be applied separately or cumulatively as described in greater detail in this document.

In accordance with one embodiment, the system for controlling modulation (e.g., a pulse width modulation mode) of an inverter comprises an interface 205 (e.g., frequency detector) for measuring or determining a fundamental frequency output of at least one phase output of the inverter. A current measurement module 201 is adapted to measure an observed current level for the inverter. A data processor 264 or mode controller 203 accesses a stored representation 207 of first current level versus fundamental frequency output at which a total harmonic distortion level is less than threshold total harmonic distortion level. The data processor 264 or mode controller 203 enables the inverter to use SVPWM (space vector pulse width modulation) if the observed current level is less than the first current level for the measured or determined fundamental frequency. Further, the data processor 264 or mode controller 203 enables the inverter to use DPWM (discontinuous pulse width modulation) if the observed current level is greater than or equal to the first current level for the measured or determined fundamental frequency.

The system of FIG. 1 comprises an interface 205 (e.g., frequency detector) for measuring or determining a fundamental frequency output of at least one phase output of the inverter. In one embodiment, the interface 205 (e.g., frequency detector) may comprise a frequency counter for counting pulses per time period at the inverter output (e.g., of a pulse width modulation waveform) to derive a fundamental frequency for the output of one or more inverter phases. For example, the fundamental frequency may comprises the fundamental frequency output by one or more phases of the inverter, where the fundamental frequency output typically has a greater average power or average amplitude than any harmonic frequencies (e.g., integer multiples of the fundamental frequency or higher order interference between two signals or phases) outputted by the inverter. The interface 205 (e.g., frequency detector) may be coupled to one or more phase outputs ($V_a^*$, $V_b^*$, $V_c^*$) of the pulse width modulation generation module 112, as indicated by the dashed lines in FIG. 1. The dashed lines indicate that the connection between the pulse width modulation generation module 112 and the interface 205 (e.g., frequency detector) may only apply to any single representative phase output or may be deleted for an alternate embodiment.

In an alternate embodiment, a sensor 115 or primary processing module 114 may provide rotor speed data, of a motor coupled to the inverter, to the interface 205 such that the interface 205 derives the fundamental frequency from a known relationship between the fundamental frequency and the rotor speed, which may depend upon a design (e.g., number of poles of the rotor and stator) of the motor. Accordingly, in an alternate embodiment, the conductor connections, between the phases ($V_a^*$, $V_b^*$, $V_c^*$) of the pulse width modulation generation module 112 and the interface 205 (e.g., frequency detector), can be replaced by the connection between the primary processing module 114 and the interface 205, as indicated by the dashed lines.

In yet another alternate embodiment, the interface 205 may be deleted and the speed data may be transmitted via a direct connection or transmission path to the mode controller 203. If the interface 205 is used to receive rotor speed data, the interface 205 may scale the data, provide buffer management, filtering or smoothing to the data for input to the mode controller 203.

The current measurement module 201 is adapted to measure an observed current level for the inverter. The current measurement module 201 can use measured current or commanded current, such as the direct axis current ($i_d^*$) and the quadrature access current ($i_q^*$) that is available at the output of summer 119. The current measurement module 201 provides an observed current for one or more sampling periods to the mode controller 203. For example, the current measurement module 201 may provide an observed current for a series of successive sampling periods or intervals during operation of the inverter. One possible embodiment of the current measurement module 201 is further described later in conjunction with FIG. 3.

The data processor 264 or mode controller 203 accesses a stored representation 207 of first current level versus fundamental frequency output at which a total harmonic distortion level, is less than threshold total harmonic distortion level while operating in DPWM. The total harmonic distortion level is related to an observed current level at a corresponding fundamental frequency. The combination of the observed current level and the fundamental frequency or the combination of the observed current level and the rotor speed may be referred to as an operating point. For example, the operating point falls within a certain region or on an appropriate side of a boundary (e.g., linear boundary) of the region, the data processor 264 or mode controller 203 estimates that the estimated total harmonic distortion is less than or equal to the threshold total harmonic distortion level. In one embodiment, a stored representation 207s of the current level versus the fundamental frequency (or rotor speed) for the threshold total harmonic distortion level may be determined in a characterization process of an inverter coupled to a load or corresponding motor (e.g., matched pair of a particular motor and corresponding inverter). In other embodiments, the stored representation 207 may be stored as a factory setting or based on one or more empirical studies.

In one embodiment, the data processor 264 or mode controller 203 enables the inverter to use SVPWM (space vector pulse width modulation) if the observed current level is less than the first current level for the measured or determined fundamental frequency (or determined rotor speed). Further, the data processor 264 or mode controller 203 enables the inverter to use DPWM (discontinuous pulse width modulation) if the observed current level is greater than or equal to the first current level for the measured or determined fundamental frequency (or determined rotor speed).

In certain embodiments, the method or system for controlling modulation (e.g., pulse width modulation mode) of an inverter comprises a sensor (e.g., resolver, encoder or position sensor) for measuring or determining a rotor speed of a motor (or equivalent load) coupled to the inverter. A current measurement module 201 is adapted to measure an observed current level for the inverter. A data processor 264 or mode controller 203 accesses a stored representation 207 of first current level versus rotor speed output at which a total harmonic distortion level, is less than threshold total harmonic distortion level while operating in DPWM. The data processor 264 or mode controller 203 enables the inverter to use SVPWM (space vector pulse width modulation) if the observed current level is less than the first current level for the measured or determined rotor speed. Further, the data processor 264 or mode controller 203 enables the inverter to use DPWM (discontinuous pulse width modulation) if the observed current level is greater than or equal to the first current level for the measured or determined rotor speed. A hysteresis factor may be applied in conjunction with the above current level analysis and associated estimated total harmonic distortion to delay, postpone, inhibit, prevent or control transition between modulation modes, such as DPWM and SVPWM.

Figure 2:
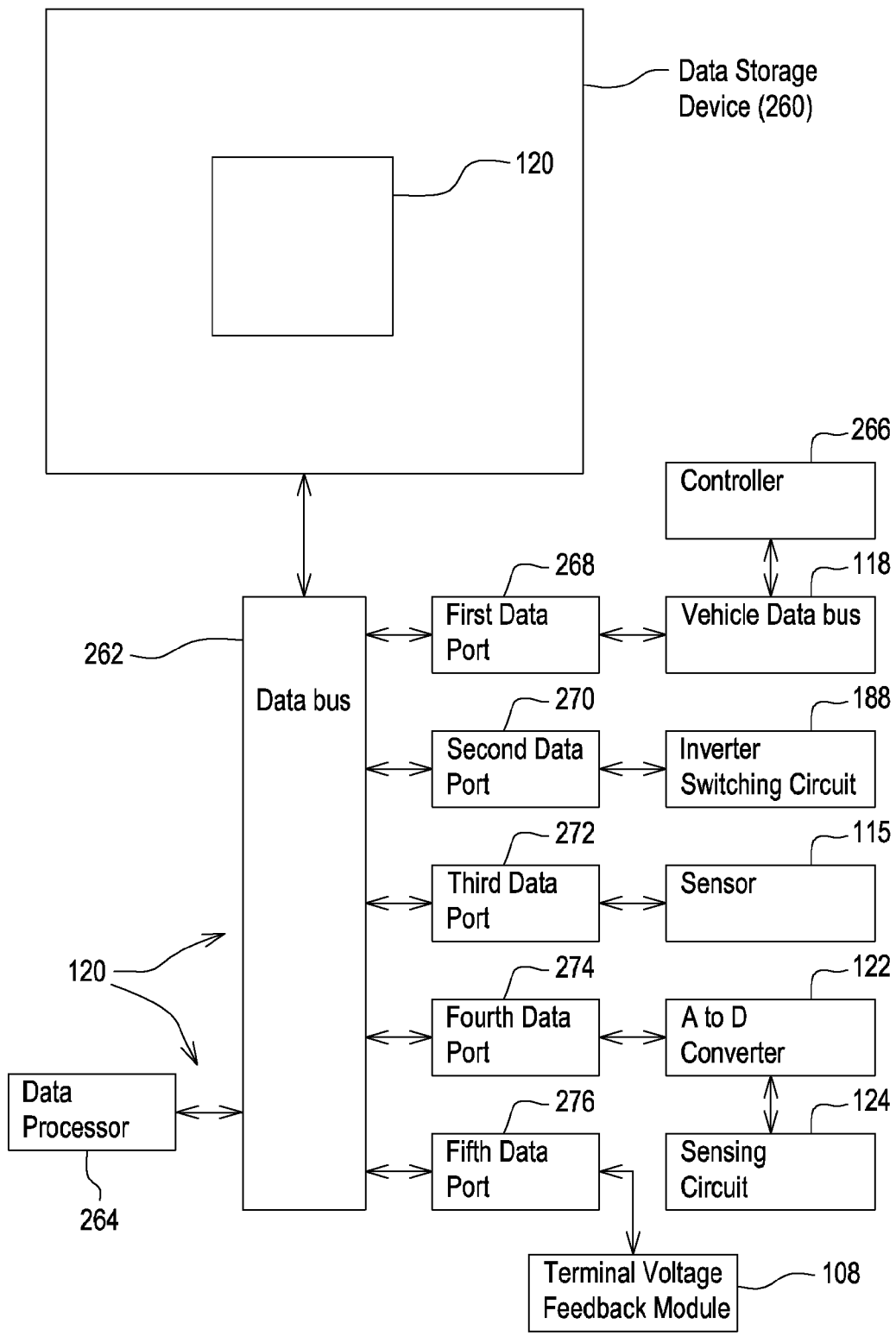
FIG. 2 is a block diagram of one possible configuration of a system for controlling a modulation mode of an inverter, consistent with FIG. 1.

FIG. 1 and FIG. 2 also provide the context of other software modules and components of the inverter that support and interface 205 with the system for controlling the modulation of the inverter.

In accordance with one embodiment, FIG. 1 discloses system for controlling a motor 117 (e.g., an interior permanent magnet (IPM) motor) or another alternating current machine. In one embodiment, the system, aside from the motor 117, may be referred to as an inverter or a motor controller.

The system comprises electronic modules, software modules, or both. In one embodiment, the motor controller comprises an electronic data processing system 120 to support storing, processing or execution of software instructions of one or more software modules. The electronic data processing system 120 is indicated by the dashed lines in FIG. 1 and is shown in greater detail in FIG. 2.

The data processing system 120 is coupled to an inverter circuit 188. The inverter circuit 188 comprises a semiconductor drive circuit that drives or controls switching semiconductors (e.g., insulated gate bipolar transistors (IGBT) or other power transistors) to output control signals for the motor 117. In turn, the inverter circuit 188 is coupled to the motor 117. The motor 117 is associated with a sensor 115 (e.g., a position sensor, a resolver or encoder position sensor) that is associated with the motor shaft 126 or the rotor. The sensor 115 and the motor 117 are coupled to the data processing system 120 to provide feedback data (e.g., current feedback data, such as $i_a$, $i_b$, $i_c$), raw position signals, among other possible feedback data or signals, for example.

Other possible feedback data includes, but is not limited to, winding temperature readings, semiconductor temperature readings of the inverter circuit 188, three phase voltage data, or other thermal or performance information for the motor 117.

In one embodiment, the torque command generation module 105 is coupled to a d-q axis current generation manager 109 (e.g., d-q axis current generation look-up tables). D-q axis current refers to the direct axis current and the quadrature axis current as applicable in the context of vector-controlled alternating current machines, such as the motor 117. The output of the d-q axis current generation manager 109 and the output of a current adjustment module 107 (e.g., d-q axis current adjustment module 107) are fed to a summer 119. In turn, one or more outputs (e.g., direct axis current data ($i_d^*$) and quadrature axis current data ($i_q^*$)) of the summer 119 are provided or coupled to a current regulation controller 111.

The current regulation controller 111 is capable of communicating with the pulse-width modulation (PWM) generation module 112 (e.g., space vector PWM generation module). The current regulation controller 111 receives respective d-q axis current commands (e.g., $i_d^*$ and $i_q^*$) and actual d-q axis currents (e.g., $i_d$ and $i_q$) and outputs corresponding d-q axis voltage commands (e.g., $v_d^*$ and $v_q^*$ commands) for input to the PWM generation module 112.

In one embodiment, the PWM generation module 112 converts the direct axis voltage and quadrature axis voltage data from two phase data representations into three phase representations (e.g., three phase voltage representations, such as $v_a^*$, $v_b^*$ and $v_c^*$) for control of the motor 117, for example. Outputs of the PWM generation module 112 are coupled to the inverter 188.

The inverter circuit 188 comprises power electronics, such as switching semiconductors to generate, modify and control pulse-width modulated signals or other alternating current signals (e.g., pulse, square wave, sinusoidal, or other waveforms) applied to the motor 117. The PWM generation module 112 provides inputs to a driver stage within the inverter circuit 188. An output stage of the inverter circuit 188 provides a modulated signal, a pulse-width modulated signal, a pulse-width modulated voltage waveform, a voltage signal, or other alternating current signal for control of the motor. In one embodiment, the inverter 188 is powered by a direct current (DC) voltage bus.

The motor 117 is associated with a sensor 115 (e.g., a resolver, encoder, speed sensor, or a position sensor or sensors) that estimates at least one of an angular position of the motor shaft 126, a speed or velocity of the motor shaft 126, and a direction of rotation of the motor shaft 126. The sensor 115 may be mounted on or integral with the motor shaft 126. The output of the sensor 115 is capable of communication with the primary processing module 114 (e.g., position and speed processing module). In one embodiment, the sensor 115 may be coupled to an analog-to-digital converter (not shown) that converts analog position data or velocity data to digital position or velocity data, respectively. In other embodiments, the sensor 115 (e.g., digital position encoder) may provide a digital data output of position data or velocity data for the motor shaft 126 or rotor.

A first output (e.g., position data and speed data for the motor 117) of the primary processing module 114 is communicated to the phase converter 113 (e.g., three-phase to two-phase current Park transformation module) that converts respective three-phase digital representations of measured current into corresponding two-phase digital representations of measured current. A second output (e.g., speed data) of the primary processing module 114 is communicated to the calculation module 110 (e.g., adjusted voltage over speed ratio module).

An input of a sensing circuit 124 is coupled to terminals of the motor 117 for sensing at least the measured three-phase currents and a voltage level of the direct current (DC) bus (e.g., high voltage DC bus which may provide DC power to the inverter circuit 188). An output of the sensing circuit 124 is coupled to an analog-to-digital converter 122 for digitizing the output of the sensing circuit 124. In turn, the digital output of the analog-to-digital converter 122 is coupled to the secondary processing module 116 (e.g., Direct current (DC) bus and three phase current processing module). For example, the sensing circuit 124 is associated with the motor 117 for measuring three phase currents (e.g., current applied to the windings of the motor 117, back EMF induced into the windings, or both).

Certain outputs of primary processing module 114 and the secondary processing module 116 feed the phase converter 113. For example, the phase converter 113 may apply a Park transformation or other conversion equations (e.g., certain conversion equations that are suitable are known to those of ordinary skill in the art) to convert the measured three-phase representations of current into two-phase representations of current based on the digital three-phase current data from the secondary processing module 116 and position data from the sensor 115. The output of the phase converter 113 module is coupled to the current regulation controller 111.

Other outputs of the primary processing module 114 and the secondary processing module 116 may be coupled to inputs of the calculation module 110 (e.g., adjusted voltage over-speed ratio calculation module). For example, the primary processing module 114 may provide speed data (e.g., motor shaft 126 revolutions per minute), whereas the secondary processing module 116 may provide a measured level of direct current voltage (e.g., on the direct current (DC) bus of a vehicle). The direct current voltage level on the DC bus that supplies the inverter circuit 188 with electrical energy may fluctuate or vary because of various factors, including, but not limited to, ambient temperature, battery condition, battery charge state, battery resistance or reactance, fuel cell state (if applicable), motor load conditions, respective motor torque and corresponding operational speed, and vehicle electrical loads (e.g., electrically driven air-conditioning compressor). The calculation module 110 is connected as an intermediary between the secondary processing module 116 and the (direct-quadrature) dq-axis current generation manager 109. The output of the calculation module 110 can adjust or impact current commands generated by the d-q axis current generation manager 109 to compensate for fluctuation or variation in direct current bus voltage, among other things.

The current shaping module 106 and the terminal voltage feedback module 108 are coupled to or are capable of communicating with the dq-axis current adjustment module 107. In turn, the d-q axis current module 107 may communicate with the dq-axis current generation manager or the summer 119.

In one embodiment, the method or system may operate in the following manner. The torque command generation module 105 receives an input control data message, such as a speed control data message, a voltage control data message, or a torque control data message, over a vehicle data bus 118. The torque command generation module 105 converts the received input control message into torque control command data 316.

The d-q axis current generation manager 109 selects or determines the direct axis current command data and the quadrature axis current command data associated with respective torque control command data and respective detected motor shaft 126 speed data. For example, the d-q axis current generation manager 109 selects or determines the direct axis current command, the quadrature axis current command by accessing one or more of the following: (1) a look-up table, database or other data structure that relates respective torque commands to corresponding direct and quadrature axes currents, (2) a set of quadratic equations or linear equations that relate respective torque commands to corresponding direct and quadrature axes currents, or (3) a set of rules (e.g., if-then rules) that relates respective torque commands to corresponding direct and quadrature axes currents. The sensor 115 on the motor 117 facilitates provision of the detected speed data for the motor shaft 126, where the primary processing module 114 may convert position data provided by the sensor 115 into speed data.

The current adjustment module 107 (e.g., d-q axis current adjustment module) provides current adjustment data to adjust the direct axis current command data and the quadrature axis current command data based on input data from the current shaping module 106, and the terminal voltage feedback module 108.

The current shaping module 106 may determine a correction or preliminary adjustment of the quadrature axis (q-axis) current command and the direct axis (d-axis) current command based on one or more of the following factors: torque load on the motor 117 and speed of the motor 117, for example. The terminal voltage feedback module 108 may provide a third adjustment to d-axis and q-axis current based on a controller voltage command versus voltage limit. The current adjustment module 107 may provide an aggregate current adjustment that considers one or more of the following adjustments: a preliminary adjustment, a secondary adjustment, and a third adjustment.

In one embodiment, the motor 117 may comprise an interior permanent magnet (IPM) machine or an IPM synchronous machine (IPMSM). An IPMSM has many favorable advantages compared with conventional induction machines or surface mounted permanent magnet (SMPM) machines such as high efficiency, high power density, wide constant power operating region, and maintenance free, for instance.

The sensor 115 (e.g., shaft or rotor speed detector) may comprise one or more of the following: a direct current motor, an optical encoder, a magnetic field sensor (e.g., Hall Effect sensor), magneto-resistive sensor, and a resolver (e.g., a brushless resolver). In one configuration, the sensor 115 comprises a position sensor, where position data and associated time data are processed to determine speed or velocity data for the motor shaft 126. In another configuration, the sensor 115 comprises a speed sensor, or the combination of a speed sensor and an integrator to determine the position of the motor shaft.

In yet another configuration, the sensor 115 comprises an auxiliary, compact direct current generator that is coupled mechanically to the motor shaft 126 of the motor 117 to determine speed of the motor shaft 126, where the direct current generator produces an output voltage proportional to the rotational speed of the motor shaft 126. In still another configuration, the sensor 115 comprises an optical encoder with an optical source that transmits a signal toward a rotating object coupled to the shaft 126 and receives a reflected or diffracted signal at an optical detector, where the frequency of received signal pulses (e.g., square waves) may be proportional to a speed of the motor shaft 126. In an additional configuration, the sensor 115 comprises a resolver with a first winding and a second winding, where the first winding is fed with an alternating current, where the voltage induced in the second winding varies with the frequency of rotation of the rotor.

In FIG. 2, the electronic data processing system 120 comprises an electronic data processor 264, a data bus 262, a data storage device 260, and one or more data ports (268, 270, 272, 274 and 276). The data processor 264, the data storage device 260 and one or more data ports are coupled to the data bus 262 to support communications of data between or among the data processor 264, the data storage device 260 and one or more data ports.

In one embodiment, the data processor 264 may comprise an electronic data processor, a microprocessor, a microcontroller, a programmable logic array, a logic circuit, an arithmetic logic unit, an application specific integrated circuit, a digital signal processor, a proportional-integral-derivative (PID) controller, or another data processing device.

The data storage device 260 may comprise any magnetic, electronic, or optical device for storing data. For example, the data storage device 260 may comprise an electronic data storage device, an electronic memory, non-volatile electronic random access memory, one or more electronic data registers, data latches, a magnetic disc drive, a hard disc drive, an optical disc drive, or the like.

As shown in FIG. 2, the data ports comprise a first data port 268, a second data port 270, a third data port 272, a fourth data port 274 and a fifth data port 276, although any suitable number of data ports may be used. Each data port may comprise a transceiver and buffer memory, for example. In one embodiment, each data port may comprise any serial or parallel input/output port.

In one embodiment as illustrated in FIG. 2, the first data port 268 is coupled to the vehicle data bus 118. In turn, the vehicle data bus 118 is coupled to the controller 266. In one configuration, the second data port 270 may be coupled to the inverter circuit 188; the third data port 272 may be coupled to the sensor 115; the fourth data port 274 may be coupled to the analog-to-digital converter 122; and the fifth data port 276 may be coupled to the terminal voltage feedback module 108. The analog-to-digital converter 122 is coupled to the sensing circuit 124.

In one embodiment of the data processing system 120, the torque command generation module 105 is associated with or supported by the first data port 268 of the electronic data processing system 120. The first data port 268 may be coupled to a vehicle data bus 118, such as a controller area network (CAN) data bus. The vehicle data bus 118 may provide data bus messages with torque commands to the torque command generation module 105 via the first data port 268. The operator of a vehicle may generate the torque commands via a user interface, such as a throttle, a pedal, a controller 266, or other control device.

In certain embodiments, the sensor 115 and the primary processing module 114 may be associated with or supported by a third data port 272 of the data processing system 120.

In one embodiment, a system of determining a position of a rotor in a motor 117 comprises a data storage device 260 for storing a plurality of previous position readings of the rotor for a previous cycle of a pulse width modulation signal applied to the motor. The previous position readings comprise a previous cycle final selected position and a previous cycle raw position. A data port (e.g., third data port 272) is configured for receiving a current raw position reading for the current cycle from a sensor 115. A data processor 264 is adapted for executing software instructions within a primary processing module 114 for determining a predicted position reading for a current cycle based on at least one of the plurality of stored previous position readings of the previous cycle. The predicted position reading comprises the previous cycle final selected position for a first mode and the previous cycle raw position for a second mode. The primary processing module 114 or the data processor 264 is adapted to determine whether a difference between the current raw position reading and the predicted position reading for the first mode and the second mode is within a preset threshold. The primary processing module 114 or the data processor 264 is adapted to select the current raw position reading as a verified reliable final position reading if the difference is equal to or less than the preset threshold (e.g., the primary preset threshold, the secondary preset threshold or both).

In one arrangement, the primary data processing module 114 or the data processor 264 is adapted to select the verified reliable final position reading by evaluation of a first difference between the current raw position reading and the predicted position based on previous cycle final selected position and a second difference between the predicted position based on current raw position reading and the previous cycle raw position. In another arrangement, the primary data processing module 114 or the data processor 264 is adapted to select the current raw position as the verified reliable final position reading if at least one of the first difference or the second difference is less than or equal to than the preset threshold. In yet another arrangement, the primary data processing module 114 or the data processor 264 is adapted to select the predicted position based on previous cycle final selected position as the verified reliable final position reading of current cycle if each of the first difference and the second difference is greater than the preset threshold. In yet another arrangement, the primary data processing module 114 or the data processor 264 is adapted to select the predicted position based on previous cycle raw position as the verified reliable final position reading of current cycle if each of the first difference and the second difference is less than or equal to the preset threshold.

Figure 3:
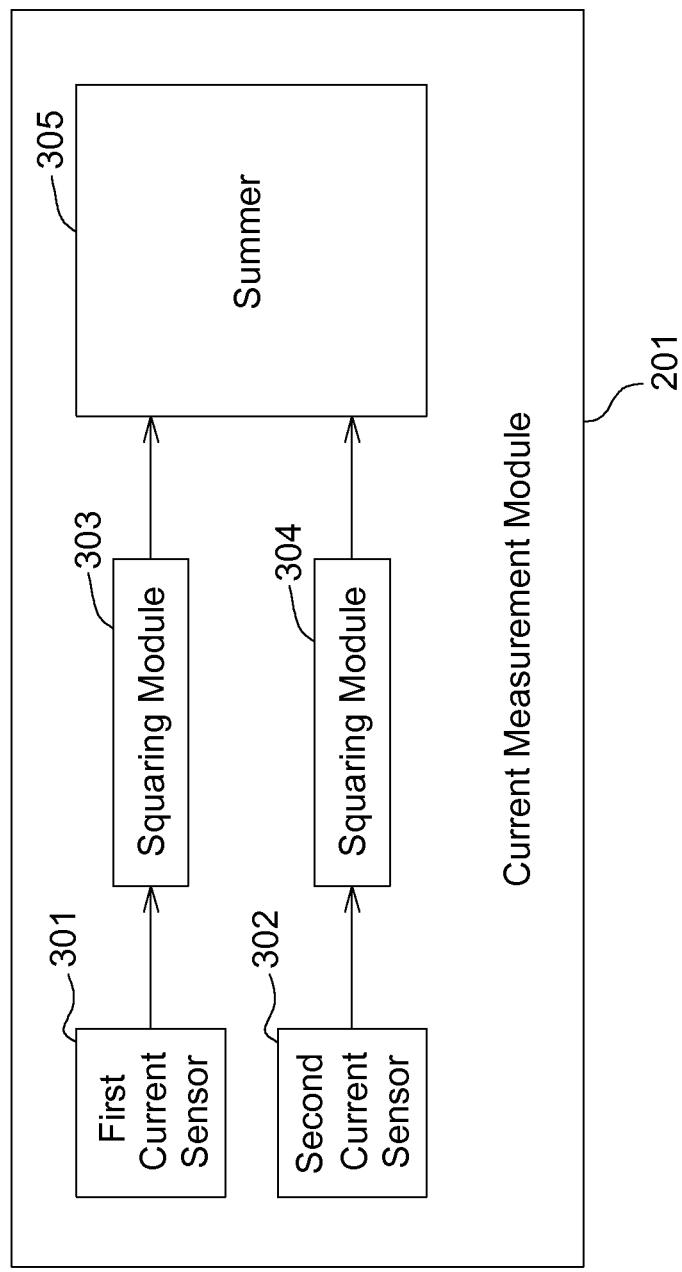
FIG. 3 is a block diagram that illustrates one possible embodiment of a current measurement module of FIG. 1.

FIG. 3 is a block diagram that illustrates one possible embodiment of a current measurement module 201 of FIG. 1. In FIG. 3, a first current sensor 301 measures or detects a direct-axis current and second current sensor 302 measures or detects a quadrature axis current. In one configuration, the direct-axis current and the quadrature axis current are inputted to the current measurement module 201 and the current measurement module 201 outputs an aggregate current level (e.g., aggregate commanded current level). The aggregate current level is based on first squaring module 303 that squares the direct axis current and a second squaring module 304 that squares the quadrature axis current. In turn, the summer 305 sums or adds the squared currents together to output an aggregate current level, which may comprise an aggregate commanded current, an observed current or a measured current. The observed current may be associated with one or more output phases of the inverter or may comprise commanded current.

Figure 4:
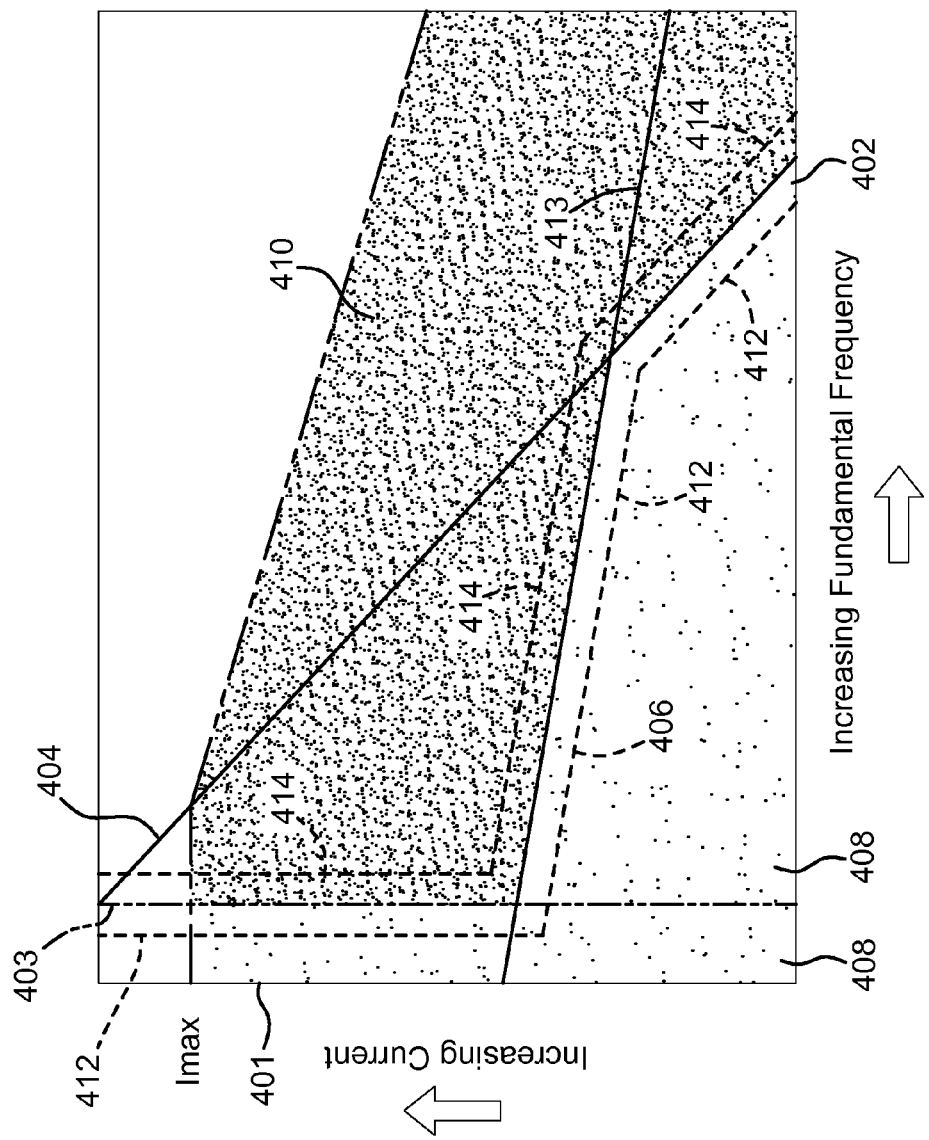
FIG. 4 shows a graph of current versus fundamental frequency (or rotor speed) for an inverter.

The FIG. 4 shows a graph of current versus fundamental frequency (or rotor speed) for an inverter. The vertical axis 401 shows observed current, whereas the horizontal axis 402 shows fundamental frequency output (or rotor speed) of one or more phases of the inverter. The vertical line 403 extends generally vertically upward from a low threshold fundamental frequency of the inverter (on the horizontal axis 402) or a corresponding low rotor speed of the motor. Although the low threshold fundamental frequency may vary based on inverter and motor design, in certain embodiments the low threshold fundamental frequency is below approximately 100 Hertz and, in some configurations, possibly below 50 Hertz.

The total harmonic distortion (THD) boundary 413 or THD reference line represents an estimated target total harmonic distortion or a total harmonic distortion threshold, while operating an inverter with a load or corresponding motor in a DPWM mode. For example, the total harmonic distortion target or the total harmonic distortion threshold may be expressed as a percentage of total harmonic distortion at one or more phase outputs of the inverter, where the total harmonic distortion represents a maximum acceptable level (e.g., ten percent or less) of total harmonic distortion while operating the inverter in the DPWM mode. As illustrated in FIG. 4 for illustrative or demonstrative purposes, the THD boundary 413 or THD reference line decreases generally linearly with increasing fundamental frequency or with increasing rotor speed. However, in one alternate embodiment the THD boundary 413 may comprise a THD reference curve that decreases in accordance with a quadratic equation with an increasing fundamental frequency or with increasing rotor speed; in another alternate embodiment the THD boundary 413 may be defined in accordance with other relationships (e.g., hybrid of linear segments and curved segments) between the current and fundamental frequency of the inverter output.

In one illustrative embodiment, the target total harmonic distortion or a total harmonic distortion is based on measurements of total harmonic distortion at the inverter output during a characterization process that is executed in laboratory, factory, workshop or other setting. Accordingly, the total harmonic distortion target and total harmonic distortion threshold may be stored as a factory setting, a user-programmable setting or another stored representation 207. The stored representation 207 may comprise a linear equation, a quadratic equation, a curve, a region, an area, a set of data points of observed current versus frequency, a look-up table, a THD look-up table, a database, a file, an inverted file, another data structure, or in another acceptable storage format in a data storage device associated with the inverter.

The modulation index boundary 404 or modulation index line represents a generally constant modulation index. As illustrated for demonstrative or illustrative purposes, the modulation index boundary 404 decreases generally linearly with increasing fundamental frequency of the inverter output or rotor speed of the motor coupled to the inverter. However, in one alternate embodiment the modulation index boundary 404 may comprise a reference curve that decreases in accordance with a quadratic equation with an increasing fundamental frequency or with increasing rotor speed; in another alternate embodiment the modulation index boundary 404 may be defined in accordance with other relationships (e.g., hybrid of linear segments and curved segments) between the current and fundamental frequency of the inverter output.

The graph of FIG. 4 has two distinct operating regions: a SVPWM operating region 408 and DPWM operating region 410. The SVPWM operating region 408 is indicated by a lightly stippled or less densely stippled area, whereas the DPWM operating region 410 is indicated by a heavily stippled or more densely stippled area. A hysteresis region is an area or strip bounded by a first hysteresis line 412 and a second hysteresis line 414. The hysteresis region is a zone (of inhibited or delayed transition) between the SVPWM operating region 408 and the DPWM region 410 is indicated with the dashed lines (412, 414) on either side of the THD boundary or the modulation index boundary. The hysteresis region is used to prevent oscillation or fluctuation between the two operating regions and their corresponding modes. Accordingly, if the hysteresis is active, the transition to from one operating region to the other operating region is no longer formed by the THD boundary 314 or the exact boundary of the SVPWM region 408, but rather by an extra margin or amount above or below the boundary (413, 404), or in to the right or left (sideways) with respect to a vertical boundary (403). That extra margin or amount is above or below the boundary (412, 414) opposite the direction in which the boundary is traversed by the operating point of the inverter (from an earlier operating point to a later operating point).

The SVPWM mode is generally active at lower frequencies that are less than the low threshold fundamental frequency, or SVPWM is generally active at equivalent lower rotor speeds that are less than an equivalent low threshold rotor speed of the motor coupled to the inverter. The SVPWM mode is generally active at the operating points of observed current and fundamental frequency that are below the current level associated with the THD boundary (413) or THD line at the corresponding fundamental frequency (or equivalent rotor speed) and where the operating point is below the modulation index limit. Meanwhile, the DPWM is active for operating points where the SVPWM is inactive, which includes operating points of observed current and fundamental frequency (or corresponding rotor speed) above the THD boundary (413), the minimum fundamental frequency limit (403) or THD line and above the modulation index boundary (404).

The transition from SVPWM to DWPM can have a large effect on both the semiconductor switch (e.g., insulated gate bipolar transistor (IGBT)) heating and the quality of the current being delivered to the motor from the inverter. To facilitate control and reliability of the semiconductor switches in the power switching circuit, data processor 264 or mode controller 203 can be programmed to operate consistent with the following software instructions, rules, or if-then statements:

1) The transition from SVPWM to DPWM should be done as early as is appropriate (after increasing rotor speed or fundamental frequency above a minimum threshold rotor speed or minimum threshold fundamental frequency) to maintain adequate current control. However, the transition shall be inhibited, disabled, or delayed if the transition to DPWM would lead to excessive THD greater than a target total harmonic distortion threshold. Accordingly, adequate current control may be defined as a THD is less than the target THD level (413).

2) DPWM cannot be used at fundamental frequencies lower than a critical or minimum fundamental frequency (403).

3) DPWM should be used whenever the modulation index is greater than a modulation index threshold (404).

In accordance with FIG. 4, SVPWM will be used for all fundamental frequencies lower than the critical or minimum fundamental frequency 403. DPWM will be used any time that the modulation index is greater than the selected modulation index limit (404). At each speed point during the characterization process, the person performing the characterization should determine the minimum current level at which the THD is less than the defined THD limit (while using DPWM), creating the line 413. After this level has been determined, it will be used along with a few other factors to decide if DPWM or SVPWM should be used.

The inverter, data processor 264 or mode controller 203 uses three main criteria to decide whether to operate in the SVPWM mode (SVPWM mode) or DPWM mode (DPWM mode): (1) THD performance line of current versus fundamental frequency (operating frequency) stored in a look-up table that is defined during a characterization phase to keep total harmonic distortion of inverter output below a threshold maximum (e.g., 10 %) while operating in DPWM mode; (2) speed of the rotor (or fundamental frequency), and (3) instantaneous modulation index. During operation, the inverter measures the commanded current, the rotor speed or fundamental frequency, and the instantaneous modulation index and compares the measurements against stored limits, operating lines, curves, or operating regions to determine one of two operational modes of the inverter. In one embodiment, the lines, curves or operating regions may comprise modified lines, curves or operating regions that are modified by hysteresis bands in a symmetrical or asymmetrical manner about the original lines, curves or regions between operating regions. In any of the methods or system disclosed in this disclosure, a hysteresis band may be associated with the stored representation of the THD to prevent unwanted transitions between the SVPWM mode and the DPWM mode, particularly where the transition might exceed a certain target transition speed or exceed a certain target frequency of transitions.

In accordance with FIG. 4, certain factors for selecting a PWM mode or a transition between modes can be stored in a data storage device (e.g., 260), while other factors can be calculated or determined in real time from measurements. For example, in one embodiment the estimated compliant THD performance (e.g., equal to or less than a maximum THD threshold level) is derived from measurements of the observed current versus fundamental frequency, whereas the modulation index (e.g., instantaneous modulation index) can be determined from voltage measurements or other measurements (e.g., at the phase outputs of an inverter switching module), as opposed to storing the modulation index in the data storage device (e.g., 260) in terms of observed current versus fundamental frequency. However, in an alternate embodiment, the instantaneous modulation index can be stored in the data storage device 260 and estimated from observed current versus fundamental frequency.

FIG. 5 through FIG. 9 provide illustrations of various operating regions of the inverter.

Figure 5:
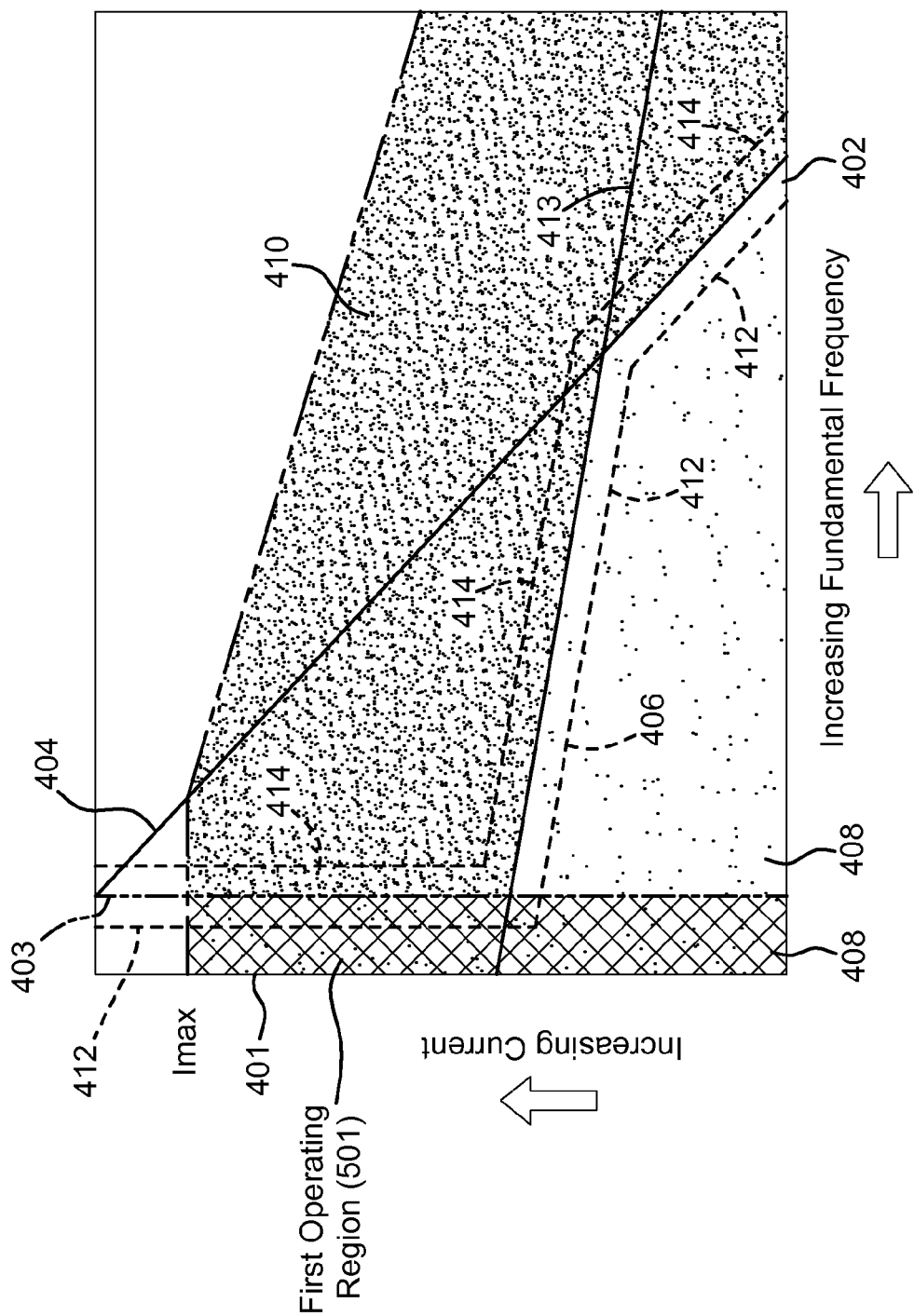
FIG. 5 illustrates a first operating region of the inverter for the graph of FIG. 4.

FIG. 5 illustrates a first operating region 501 of the inverter for the graph of FIG. 4. The first operating region 501 refers to the lower fundamental frequency operating region that is bounded by the vertical axis 401 and the vertical line 403. If the rotor speed or if the fundamental frequency is less than a threshold speed level or a threshold frequency level (e.g., associated with the intercept of the vertical line 403 with the horizontal axis 402), the inverter operates in SVPWM mode. For example, the threshold frequency level the fundamental frequency may be 30 -45 Hz. In FIG. 3, the vertical line of the critical fundamental frequency (403) indicates the frequency threshold level, where below the fundamental frequency (to the left of the vertical line); the inverter operates in the SVPWM mode. If the fundamental frequency or if the rotor speed is greater than the threshold frequency level or threshold speed level, the inverter can operate in SVPWM mode or DPWM mode depending upon one or more of the following factors: (1) commanded current versus fundamental frequency, that is determined consistent with total harmonic distortion below a threshold distortion level (e.g., 10 %) or (2) the instantaneous modulation index.

Figure 6:
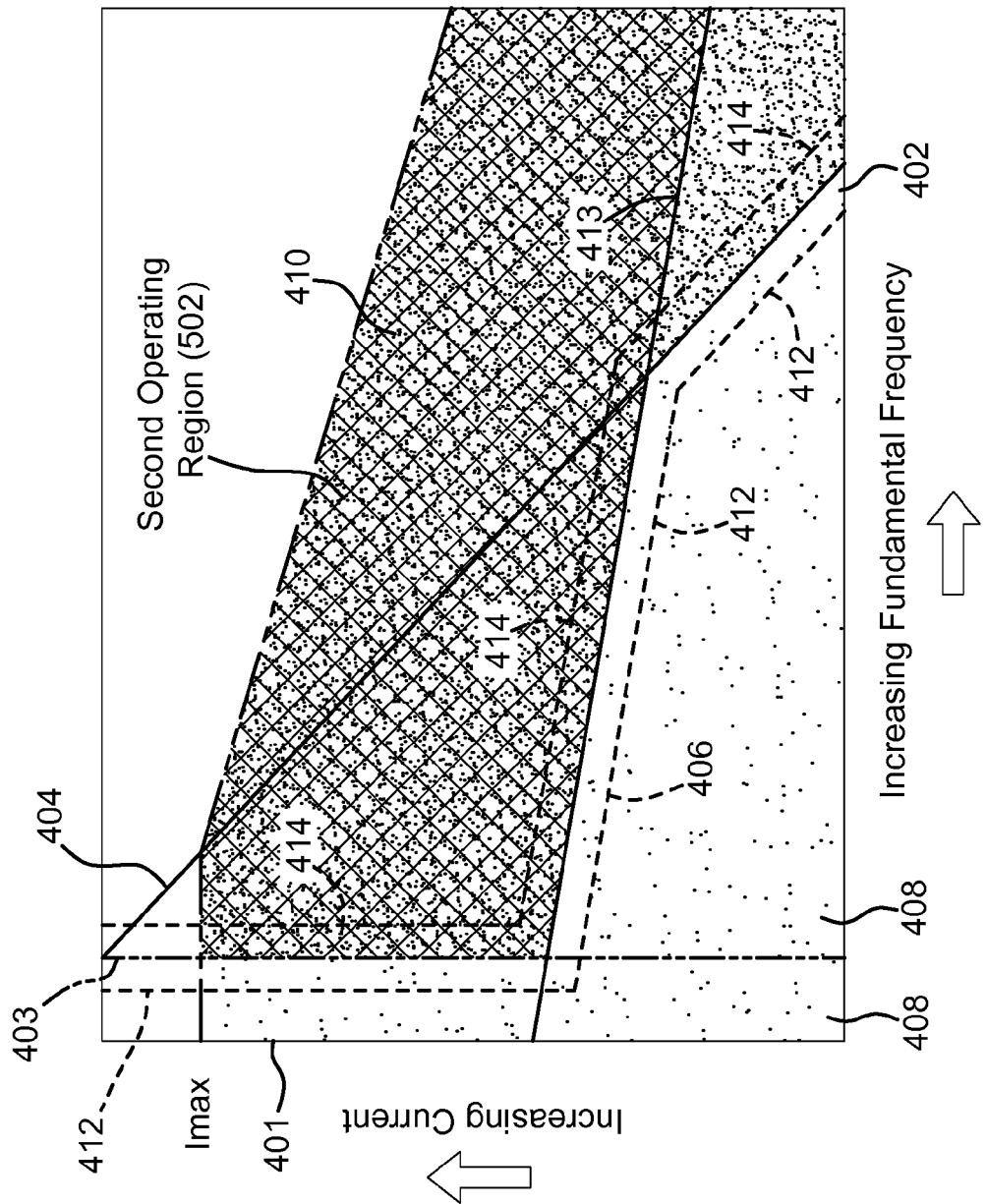
FIG. 6 illustrates a second operating region of the inverter for the graph of FIG. 4.

FIG. 6 illustrates a second operating region 502 of the inverter for the graph of FIG. 4. The second operating region 502 is bounded by area to the right of the vertical line 403 of the first operating region 501 and above the THD line or THD boundary 413 of commanded current versus fundamental frequency. The second operating region 502 represents a region where the THD in the DPWM mode is below the THD limit. The DPWM mode is used in the second operating region 502.

Although the THD level could be measured directly during the operation of the inverter coupled to a load or motor on a vehicle, such measurements would require the additional cost, weight and power consumption for additional data processing and supplemental hardware. Instead, whether or not the THD in the DPWM mode is acceptable or below the THD threshold is inferred from the commanded current and fundamental frequency that is compared to the stored representation (207) of the THD boundary 413. If the commanded current at the corresponding observed fundamental frequency is less than the THD line and if the commanded current at the corresponding observed fundamental frequency is less than for frequencies lower than a critical frequency, then mode is SVPWM mode is used. However, if the commanded current at the corresponding observed fundamental frequency is greater than the THD line for frequencies lower than a critical frequency, then DPWM mode is used. In other words, if the measured or observed current is above the THD boundary line 413, DPWM is used and if the observed current is below the THD boundary line 413 SVPWM is used.

Figure 7:
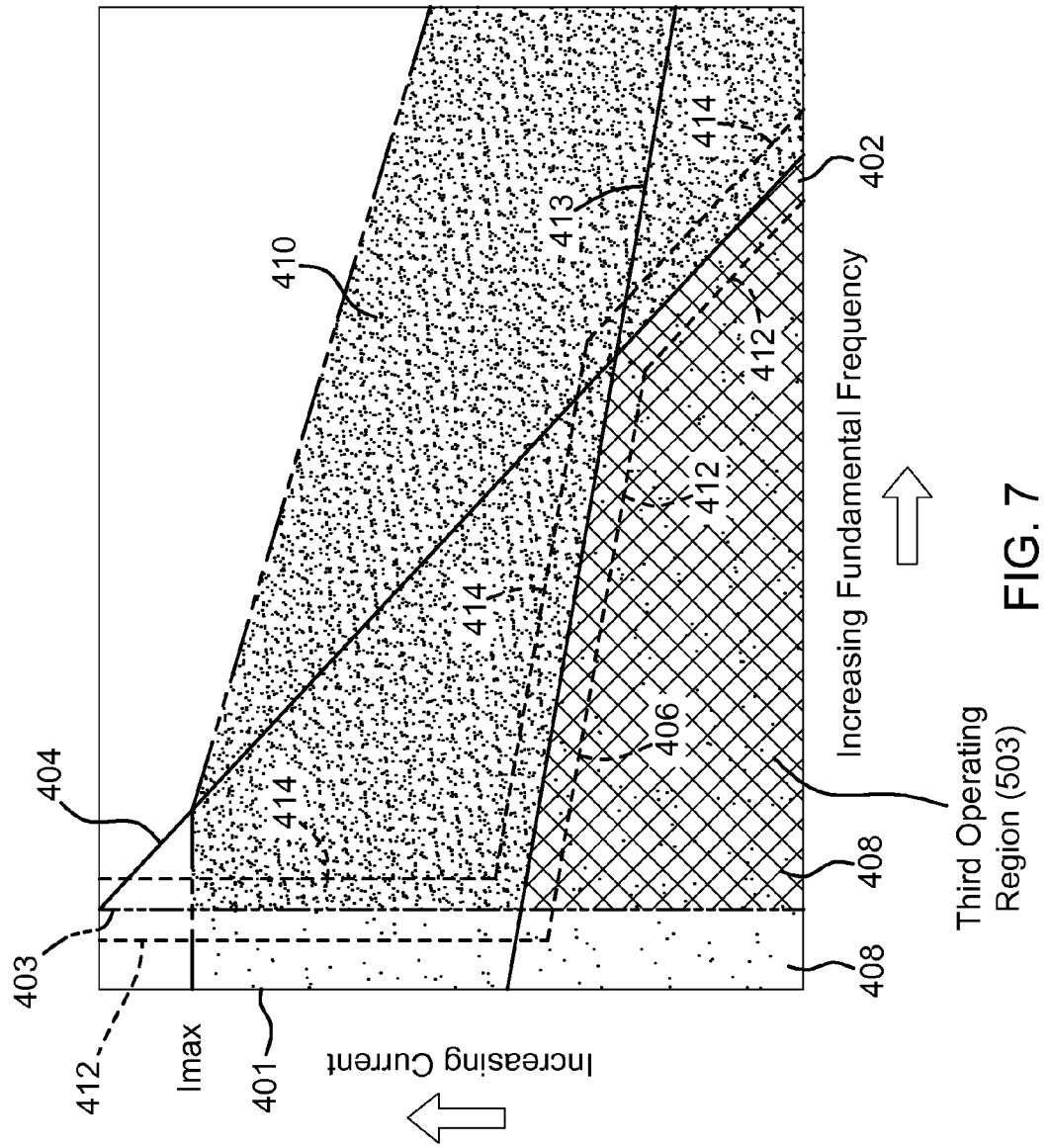
FIG. 7 illustrates a third operating region of the inverter for the graph of FIG. 4.

FIG. 7 illustrates a third operating region 503 of the inverter for the graph of FIG. 4. The third operating region 503 is bounded by the area to the right of the first vertical line (403) or the vertical axis 401 and the area below the THD line 413 up to a maximum fundamental frequency (also referred to as a critical fundamental frequency). Alternatively, the third operating region 503 is bounded by the area to the right of the first vertical line (403) or the vertical axis 401, the area below the THD line 413, and to the left of the modulation index line (404) (or modulation index threshold). In the third operating region 503, the inverter operates in the SVPWM mode.

The third operating region 503 applies at higher fundamental frequencies and a lower commanded current. In the third operating region 503, the instantaneous modulation with respect to the threshold modulation or modulation line determines whether the inverter operates in the DPWM mode or the SVPWM mode. To accomplish the decision on the modulation mode, a threshold modulation index is set (e.g., 0.8). If the observed instantaneous modulation index (e.g., derived from voltage measurements of one or more inverter output phases) is determined to be above the threshold modulation level or modulation index line 404, DPWM is used. However, if the observed instantaneous modulation index is below (e.g., derived from voltage measurements of one or more phases of the inverter), the observed current at a corresponding frequency and the stored representation 207 of the THD line 413 is used to determine the PWM mode (e.g., DPWM versus SVPM). The modulation index is a ratio of a phase output voltage to a maximum phase output voltage.

Typically, the modulation index will range from 0 to 1, although a modulation index is possible where over-modulation is used. Any modulation level above 1 generally indicates over-modulation. In one embodiment, the modulation index is compared to the modulation index limit independent of the operating point.

In another embodiment, if the commanded current at the corresponding observed fundamental frequency is less than the THD line and if the commanded current at the corresponding observed fundamental frequency is less than the modulation index line or modulation index threshold, then SVPWM mode is used. However, if the commanded current at the corresponding observed fundamental frequency is less than the THD line and if the commanded current at the corresponding observed frequency is greater than the modulation index line or modulation index threshold, then DPWM mode is used.

Figure 8:
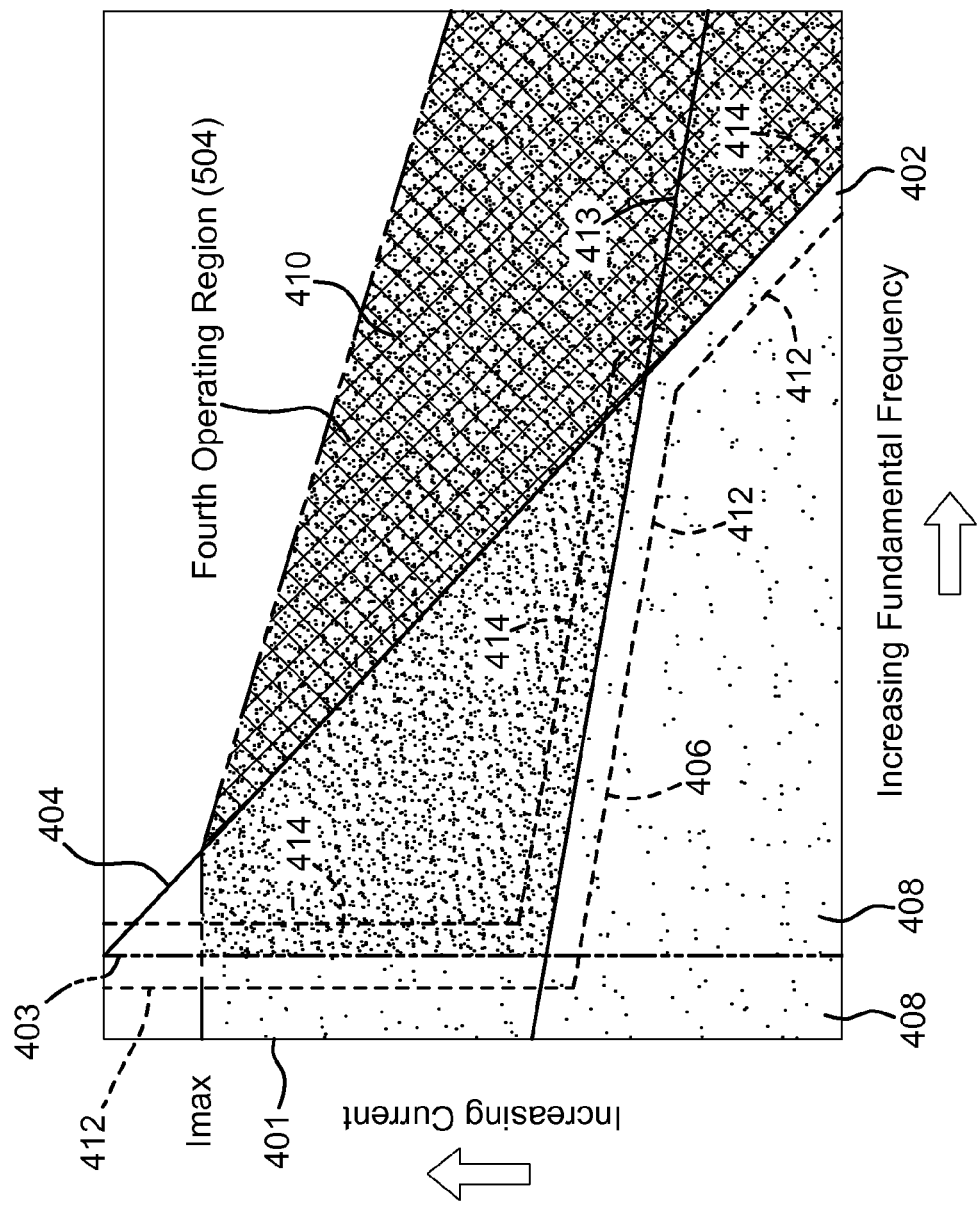
FIG. 8 illustrates a fourth operating region of the inverter for the graph of FIG. 4.

FIG. 8 illustrates a fourth operating region 504 of the inverter for the graph of FIG. 4. As shown in FIG. 8, the fourth operating region 504 can be any operational point above the modulation index boundary 404 or the modulation index limit, where the operational point is defined as a corresponding combination of current and respective fundamental frequency (e.g., current at a given fundamental frequency). In the fourth operating region 504, the inverter operates in the DPWM mode.

Figure 9:
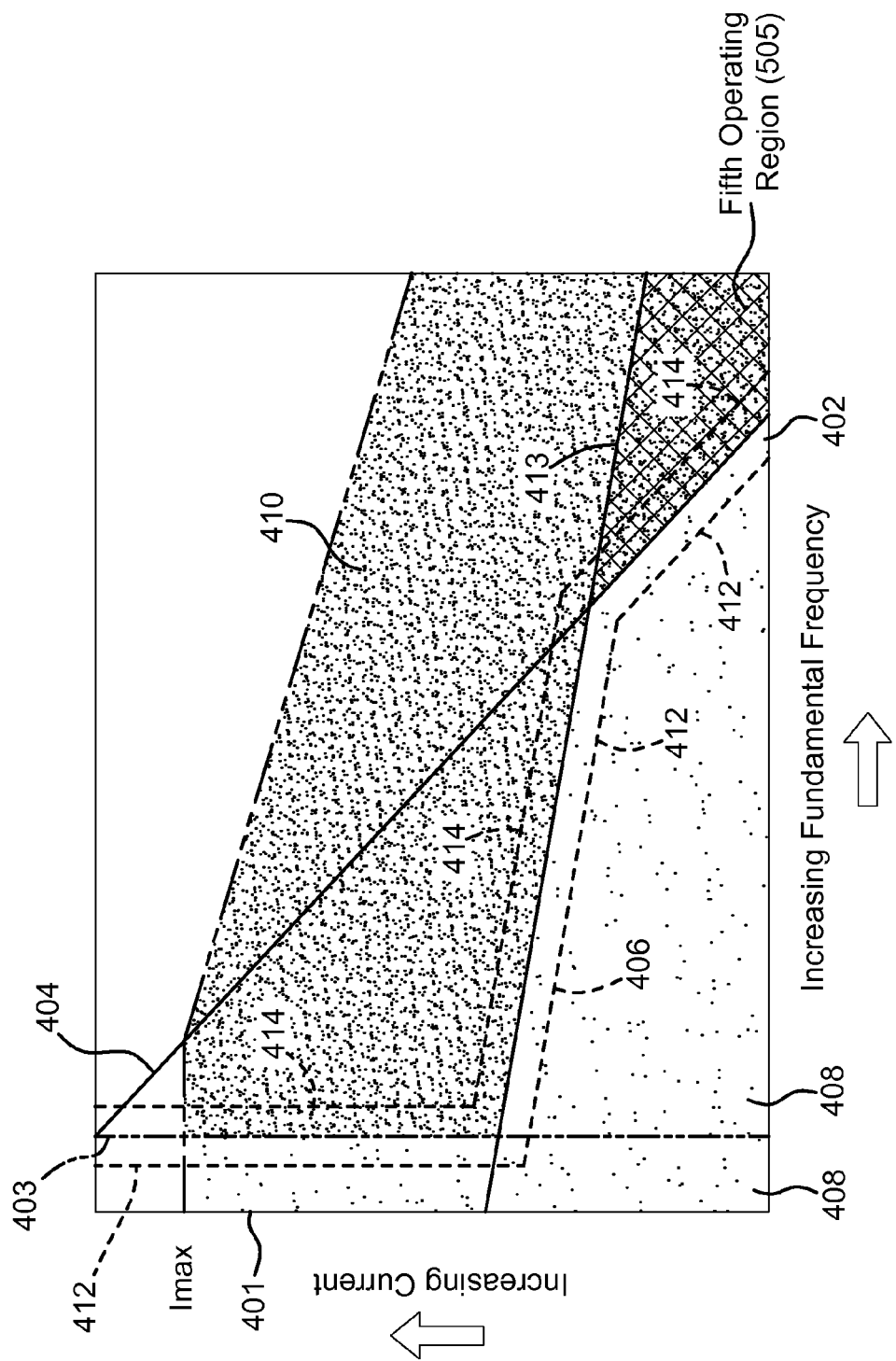
FIG. 9 illustrates a fifth operating region of the inverter for the graph of FIG. 4.

FIG. 9 illustrates a fifth operating region 505 of the inverter for the graph of FIG. 4. The fifth operating region 505 is bounded by the area to the right of the modulation index line 404 and below the THD line 413. Depending on the trend for the THD line (413) and the modulation Index line 404, the fifth operating region 505 may not exist for all systems or configurations that fall within the scope of this disclosure or the accompanying claims.

Figure 10:
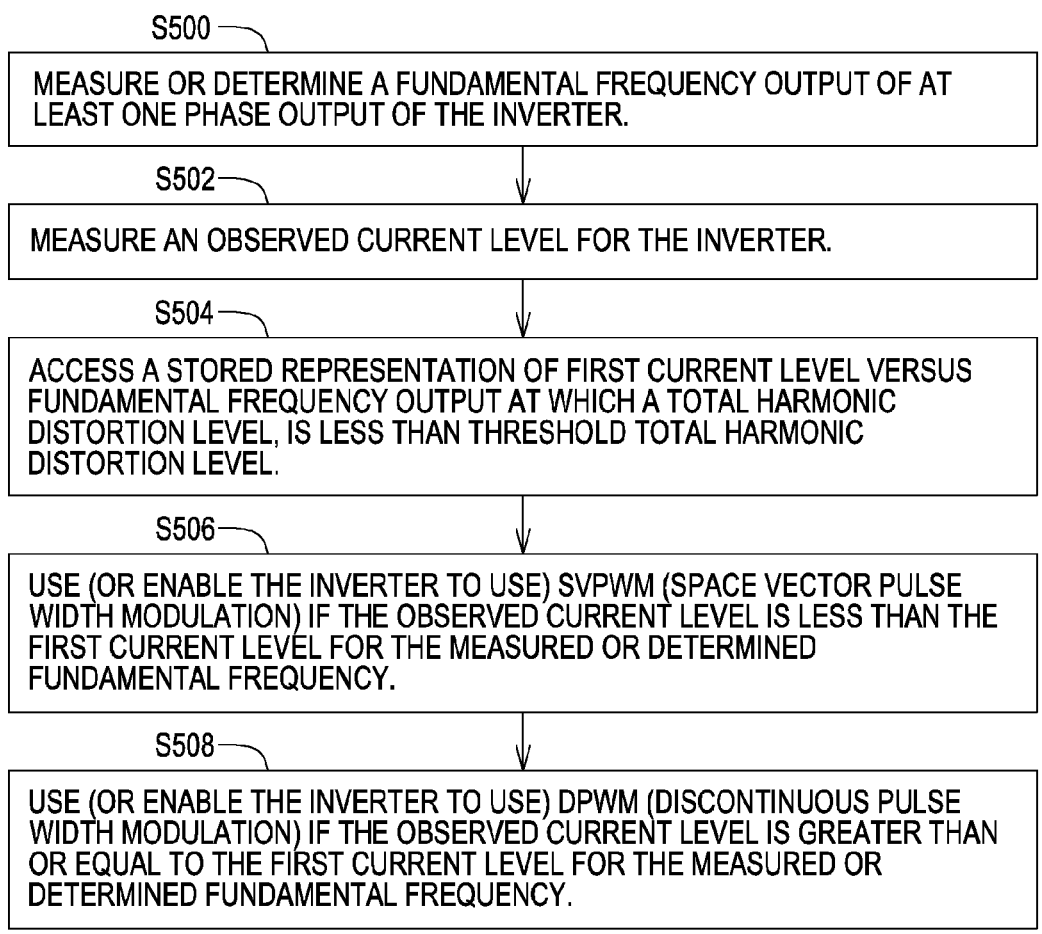
FIG. 10 is a flow chart of a first embodiment of a method for controlling a modulation mode of an inverter or a transition between a SVPWM mode and a DPWM mode based on fundamental frequency, among other things.

When transitioning from SVPWM-mode to DPWM mode, it is either THD line of current versus fundamental frequency or the modulation index for transition to DPWM mode. However, when transitioning from DPWM mode to the SVPWM mode, both THD line of current versus fundamental frequency and modulation index must be satisfied FIG. 10 is a flow chart of a first embodiment of a method for controlling a modulation mode of an inverter or a transition between a SVPWM mode and a DPWM mode based on a stored representation 207 of the THD boundary 404 or its equivalent current versus fundamental frequency (data points), among other parameters that can be separately or cumulatively applied with the parameters described in conjunction with FIG. 10. FIG. 10 begins in step S500.

In step S500, an interface 205 or frequency detector measures or determines a fundamental frequency output of at least one phase output of the inverter. In one example, the interface 205 or frequency detector may comprise a frequency counter that measures or determines the fundamental frequency output by counting pulses per unit time at the output phase terminals of the inverter switching circuit 188. In another example, the interface 205 derives the determined fundamental frequency of the inverter output from a rotor speed of a motor coupled to the inverter, or an equivalent load coupled to the inverter output. The interface 205 may access or store motor configuration data, such as the number of poles of the stator, the number of poles of the rotor, or both for determining the fundamental frequency of the inverter from the rotor speed.

In step S502, a current measurement module 201 measures an observed current level for the inverter. The observed current may comprise one or more of the following electrical currents: a commanded current level (e.g., aggregate commanded current), a direct-axis commanded current $i_d^*$, a quadrature-axis commanded current $i_q^*$, a first phase current, a second phase current, a third phase current, a measured current of any phase output (e.g., $i_a$, $i_b$, $i_c$), an aggregate measured current that is a composite of multiple phases, a sum of a squared commanded direct-axis current and a squared commanded current, and digital representations of any of the foregoing currents.

In step S504, a data processor 264 or mode controller 203 accesses a stored representation 207 of a THD boundary 413 or a first current level versus fundamental frequency output at which a total harmonic distortion level is less than a threshold total harmonic distortion level while operating in DPWM (e.g., target total harmonic distortion level).

In step S506, the data processor 264 or the mode controller 203 uses, or enables the inverter to use, SVPWM if the observed current level is less than a first current level for the measured or determined fundamental frequency. Further, in an alternate embodiment (not shown in FIG. 10) the data processor 264 or mode controller 203 may use, or enable the inverter to use, SVPWM regardless of the observed current level if the fundamental frequency is lower than the low fundamental frequency threshold (e.g., within a range of approximately 40 Hertz to approximately 100 Hertz) or the equivalent rotor speed of the motor coupled to the inverter.

In step S508, the data processor 264 or the mode controller 203 uses, or enables the inverter to use, DPWM if the observed current level is greater than or equal to the first current level for the measured or determined fundamental frequency. However, if a hysteresis is active, the mode controller 203 or data processor 264 further considers a first countervailing factor of hysteresis to oppose or inhibit the use of DPWM for an observed sampling period if the observed current level is greater than or equal to the first current level by less than a hysteresis amount for a sampling period and if the inverter is currently operating in the SPWM mode for an earlier sampling period substantially immediately prior to the observed sampling period.

In an alternate embodiment, the data processor 264 or the mode controller may be adapted to add a hysteresis band (e.g., in step S506, step S508, or both) associated with the stored representation of the THD to prevent unwanted transitions between the SVPWM mode and the DPWM mode. Further, the hysteresis may be activated when the transition might otherwise exceed a certain target transition speed or exceed a certain target frequency of transitions.

Figure 11:
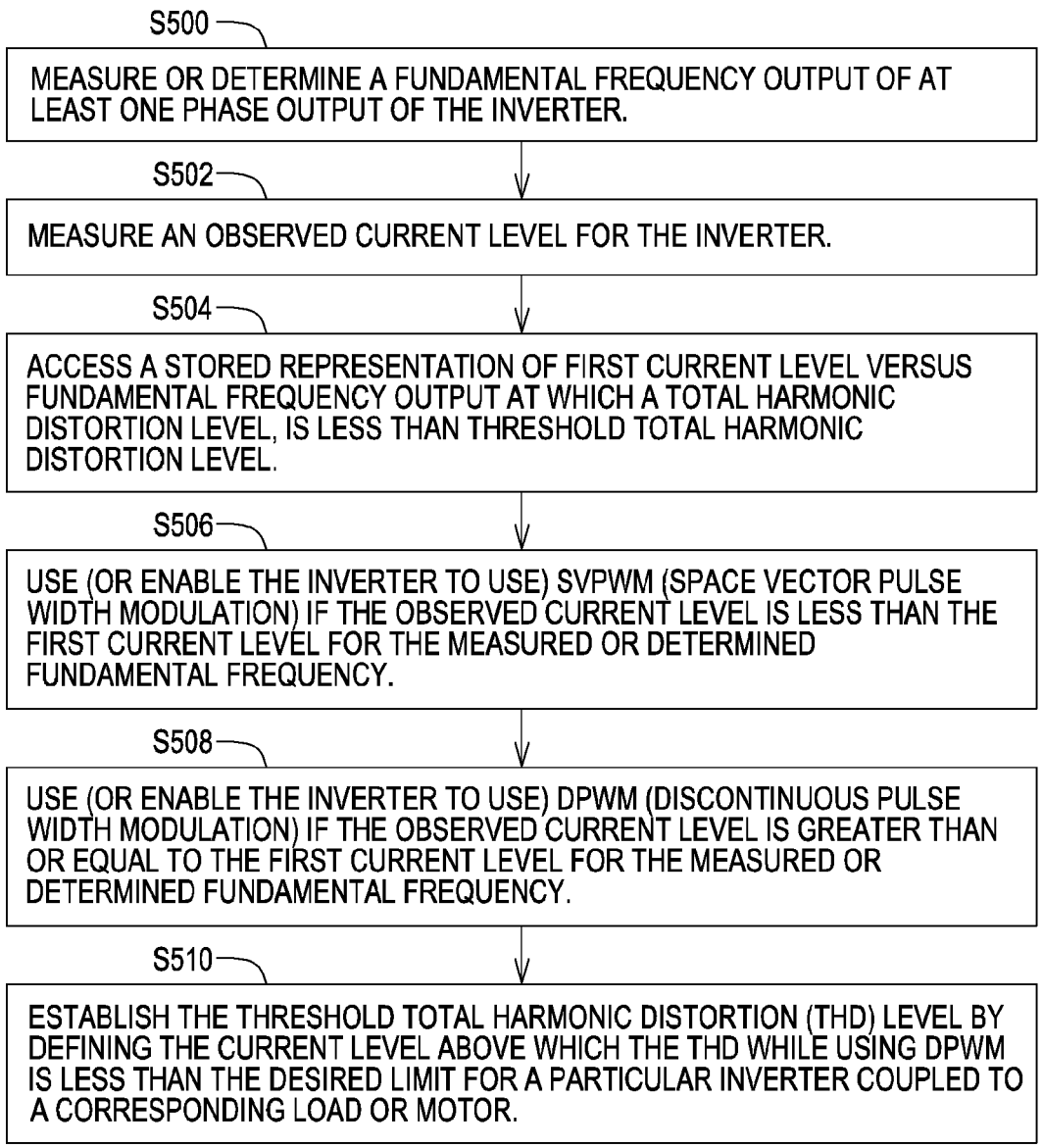
FIG. 11 is a flow chart of a second embodiment of a method for controlling a modulation mode of an inverter or a transition between a SVPWM mode and a DPWM mode.

FIG. 11 is a flow chart of a second embodiment of a method for controlling a modulation mode of an inverter or a transition between a SVPM mode and a DPWM mode. The method of FIG. 11 is similar to the method of FIG. 10, except the method of FIG. 11 further comprises step S510. Like reference numbers in FIG. 10 and FIG. 11 indicate like elements.

Steps S500, S502, S504, S506 and S508 are set forth above in conjunction with FIG. 10.

In step S510, which may be executed before, during, or after any of the above steps (except not after step S508), a spectrum analyzer, another testing device, or the combination of a computer and a testing device, establishes a threshold total harmonic distortion (THD) level by defining the current level above which the THD while using DPWM is less than the desired limit for a particular inverter coupled to a corresponding load or motor. For example, the testing device coupled to a computer may be programmed to compare the measured amplitude of the fundamental frequency to the measured amplitude of one or more harmonic frequencies to estimate the total harmonic distortion level. In one configuration, a testing device or total harmonic distortion measurement device is coupled to the output of the inverter when the inverter is electrically coupled to a motor, generator, electrical machine or equivalent electrical load. An equivalent electric load means a load that has resistance, inductance, reactance, reluctance, and back electromotive force (EMF) attributes similar to those of motor that is matched to the inverter characteristics.

Figure 12:
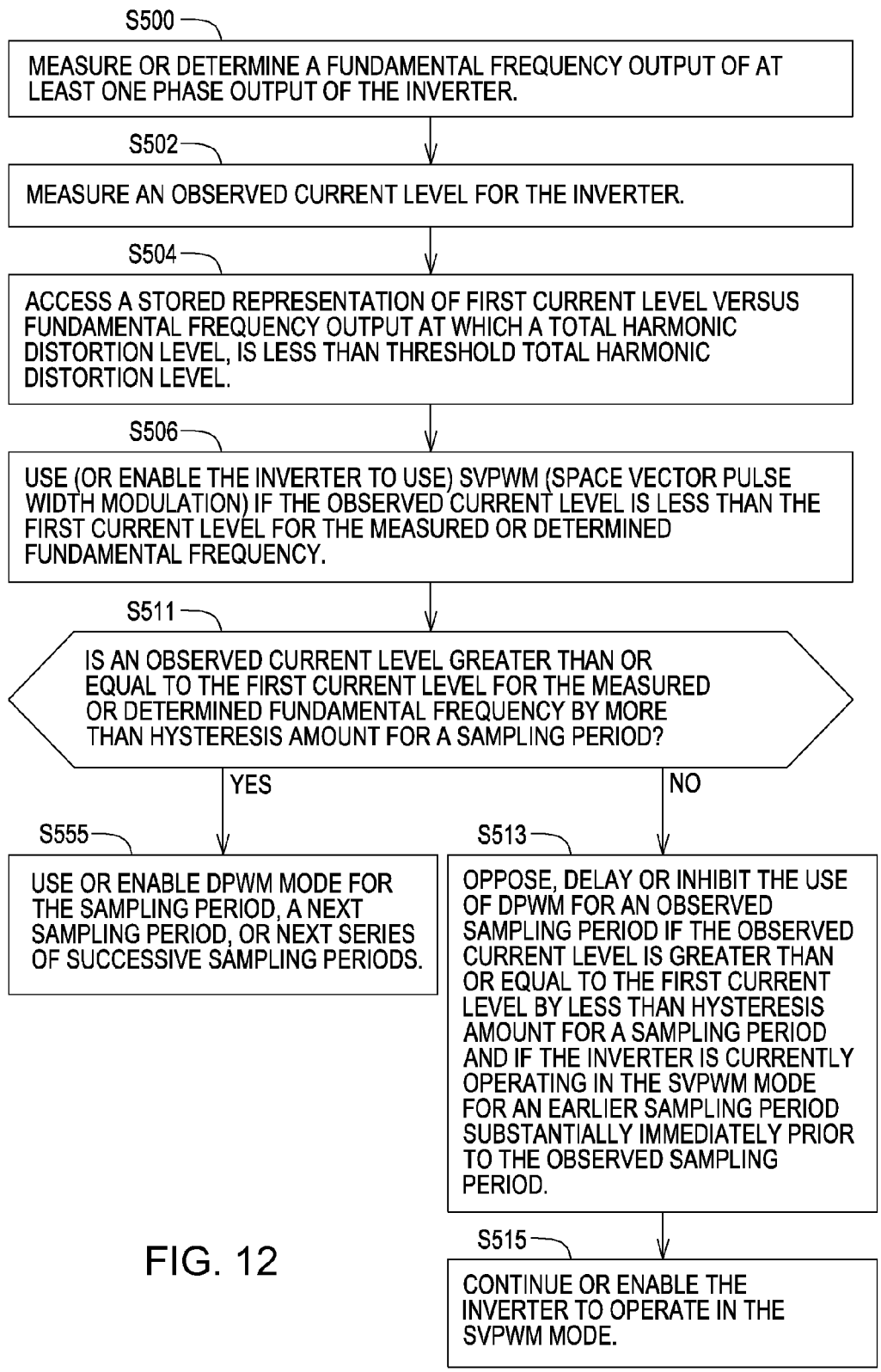
FIG. 12 is a flow chart of a third embodiment of a method for controlling a modulation mode of an inverter or a transition between a SVPWM mode and a DPWM mode.

FIG. 12 is a flow chart of a third embodiment of a method for controlling a modulation mode of an inverter or a transition between a SVPWM mode and a DPWM mode. The method of FIG. 12 is similar to the method of FIG. 10, except the method of FIG. 12 replaces step S508 with one or more of the following possible step: S511, S513, S515, and S555. Like reference numbers in FIG. 10 and FIG. 12 indicate like elements.

Steps S500, S502, S504, and S506 are set forth above in conjunction with FIG. 10. Step S511 may be executed during or after step S508 of the above steps of FIG. 12. In step S511, the data processor 264 or mode controller 203 determines whether or not the observed current level is greater than or equal to the first current level for the measured or determined fundamental frequency by more than hysteresis amount for a sampling period. If the observed current level is greater than or equal to the first measured current level plus hysteresis, the method continues with step S555. However, if the observed current level is less than the first measured current level plus hysteresis than the method continues with step S513.

In step S555, if the observed current level is greater than the first current level by equal to or more than the hysteresis amount for the sampling period, the controller will enable or activate the DPWM mode for the sampling period, a next sampling period, or next series of successive sampling periods.

In step S513, the data processor 264 or mode controller 203 opposes, delays or inhibits the use of the DPWM for an observed sampling period if the observed current level is greater than or equal to the first current level by less than hysteresis amount for a sampling period and if the inverter is currently operating in the SVPWM mode for an earlier sampling period substantially immediately prior to the observed sampling period.

In step S515, the data processor 264 or mode controller 203 continues or enables the inverter to operate in the SVPWM mode. For example, the data processor 264 or mode controller 203 continues or enables the inverter to operate in the SVPWM mode until the observed current level is greater than or equal to the first current level by more than or equal to a hysteresis amount for a later or next sampling period.

Figure 13:
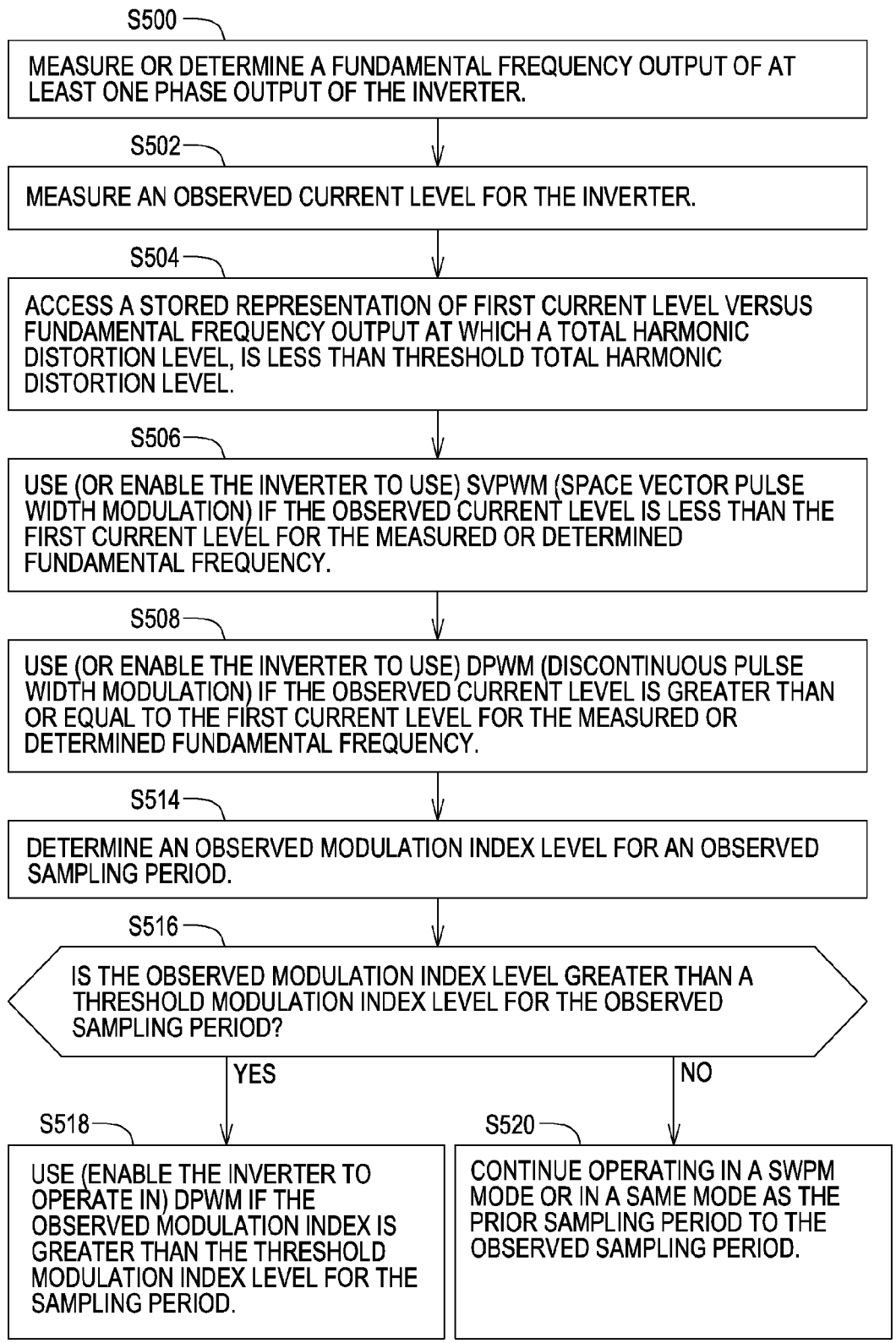
FIG. 13 is a flow chart of a fourth embodiment of a method for controlling a modulation mode of an inverter or a transition between a SVPWM mode and a DPWM mode.

FIG. 13 is a flow chart of a fourth embodiment of a method for controlling a modulation mode of an inverter or a transition between a SVPWM mode and a DPWM mode. The method of FIG. 13 is similar to the method of FIG. 10, except the method of FIG. 13 comprises additional steps with step S514, S516, S518 and S520. Like reference numbers in FIG. 10 and FIG. 13 indicate like elements.

Steps S500, S502, S504, S506, and S508 are set forth above in conjunction with FIG. 10. Step S514 may be executed before, during, or after any of the above steps of FIG. 13. In step S514, a modulation index module 209 determines an observed modulation index level for an observed sampling period of the inverter. In a first configuration, the modulation index is defined based on the active switching time for each inverter phase divided by the total switching period for that inverter phase, where the modulation index is generally equal to or between 0 and 1. In a second configuration, the modulation index is defined based on the amplitude of the direct-axis voltage and the amplitude of the quadrature-axis voltage (e.g., available at the output of the current regulation controller 209), where the modulation index is generally equal to or between 0 and 1 except where over-modulation is used and the modulation index exceeds 1. In a either the first or second configuration, the modulation index level threshold comprises a generally constant value that is associated with the observed current that decreases with increasing fundamental frequency or increasing rotor speed of a motor coupled to the inverter.

In step S516, the modulation index module 209, the mode controller 203 or the data processor 264 determines whether or not the observed modulation index level is greater than a threshold modulation index level for the observed sampling period. If the observed modulation index level is greater than the threshold modulation index level, the method continues with step S518. However if the observed modulation index level is less than or equal to the threshold modulation index level, the method continues with step S510.

In step S518, the data processor 264 or mode controller 203 uses, or enables the inverter to operate in, DPWM. Step S518 may be executed in accordance with various techniques that may be applied separately or cumulatively. Under a first technique, the data processor 264 or mode controller 203 uses, or enables the inverter to operate in, DPWM if hysteresis is inactive (e.g., by the data processor 264 or the mode controller 203).

Under a second technique, the data processor 264 or the mode controller 203 enables of the inverter to use DPWM further considers a countervailing factor (e.g., second countervailing factor) of hysteresis to oppose or inhibit the use of DPWM for an observed sampling period if hysteresis is active, if the observed modulation index is greater than the threshold modulation index level by less than a hysteresis amount for a sampling period, and if the inverter is currently operating in the SPWM mode for an earlier sampling period substantially immediately prior to the observed sampling period.

Under a third technique, the data processor 264 or the mode controller 203 enables of the inverter to use DPWM, independent of or regardless of whether or not the observed current level is greater than or equal to the first current level for the measured or determined fundamental frequency. Under the third technique, the data processor 264 or mode controller 203 is programmed, has software instructions, or has logic where step S508, S506 or both (e.g., of FIG. 10) can be overridden or superseded by step S518.

In step S520, the data processor 264 or mode controller 203 continues operating the inverter in a SVPWM mode or in a same mode as the prior sampling period to the observed sampling period. For example, the data processor 264 or the mode controller 203 enables the inverter to use SVPWM if the observed current is less than a first current level for a corresponding fundamental frequency, where the first current level is associated with the THD threshold level (e.g., operational data points associated with THD line 413) and where the observed modulation index is equal to or less than a threshold modulation index level (e.g., 404). In an alternative embodiment, the data processor 264 or the mode controller 203 enables the inverter to use SVPWM if the observed current is less than a first current level for a corresponding fundamental frequency, where the first current level is associated with the THD threshold level (e.g., operational data points associated with THD line 413) and where the observed modulation index is equal to or less than a threshold modulation index level (e.g., 404) for fundamental frequencies less than a critical fundamental frequency that corresponds to an intersection of THD line 413 and modulation index line 404.

Figure 14:
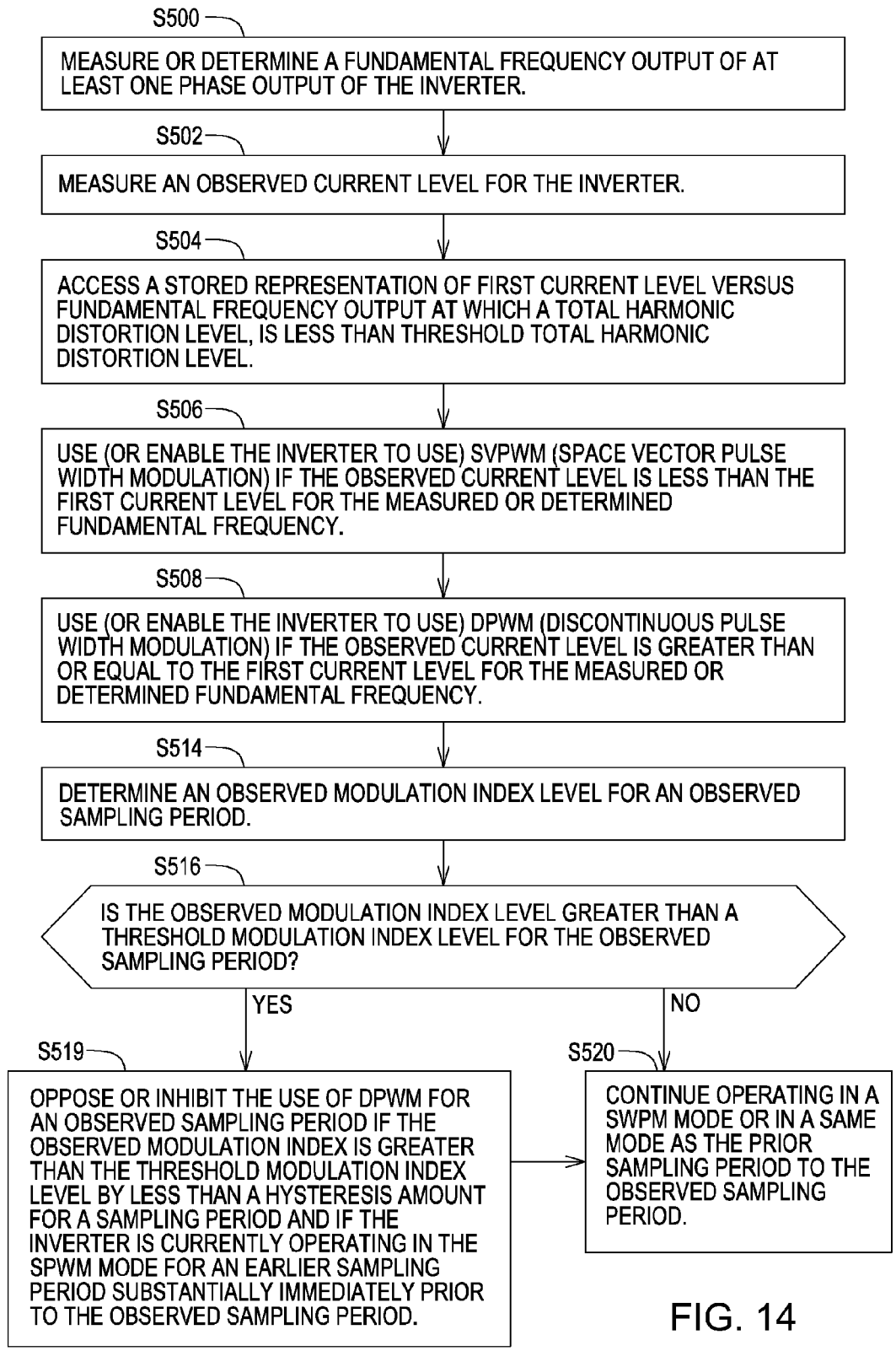
FIG. 14 is a flow chart of a fifth embodiment of a method for controlling a modulation mode of an inverter or a transition between a SVPWM mode and a DPWM mode.

FIG. 14 is a flow chart of a fifth embodiment of a method for controlling a modulation mode of an inverter or a transition between a SVPWM mode and a DPWM mode. The method of FIG. 14 is similar to the method of FIG. 13 except the method of FIG. 14 replaces step S518 with step S519. Like reference numbers in FIG. 13 and FIG. 14 indicate like steps, methods or procedures.

In step S516 of FIG. 14, the modulation index module 209, the mode controller 203 or the data processor 264 determines whether or not the observed modulation index level is greater than a threshold modulation index level for the observed sampling period. If the observed modulation index level is greater than the threshold modulation index level, the method continues with step S519. However if the observed modulation index level is less than or equal to the threshold modulation index level, the method continues with step S520.

In step S519, the data processor 264 or the mode controller 203 opposes, delays or inhibits the use of DPWM for an observed sampling period if the observed modulation index is greater than the threshold modulation index level by less than a hysteresis amount for a sampling period and if the inverter is currently operating in the SVPWM mode for an earlier sampling period substantially immediately prior to the observed sampling period. After step S519, the method continues with step S520 or step S520 may follow step S516 as indicated above.

In step S520, the data processor 264 or mode controller 203 continues operating the inverter in a SWPM mode or in a same mode as the prior sampling period to the observed sampling period.

Figure 15:
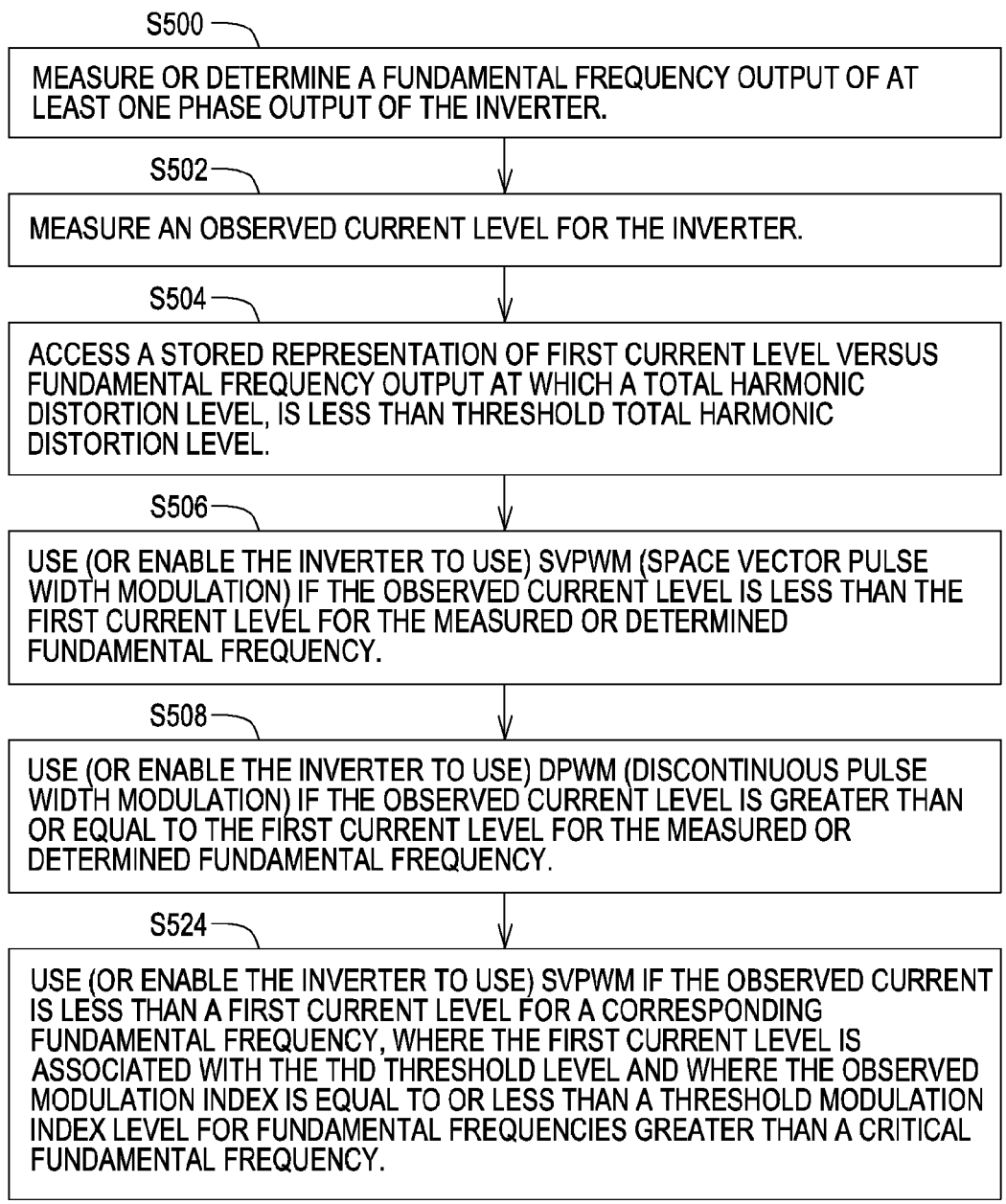
FIG. 15 is a flow chart of a sixth embodiment of a method for controlling a modulation mode of an inverter or a transition between a SVPWM mode and a DPWM mode.

FIG. 15 is a flow chart of a sixth embodiment of a method for controlling a modulation mode of an inverter or a transition between a SVPWM mode and a DPWM mode. The method of FIG. 15 is similar to the method of FIG. 10, except the method of FIG. 15 further comprises step S524. Like reference numbers in FIG. 10 and FIG. 15 indicate like elements.

Steps S500, S502, S506 and S508 are set forth above in conjunction with FIG. 10. Step S524 may be executed after any step in FIG. 15. In step S524, the data processor 264 or mode controller 203 uses or enables the inverter to use, SVPWM if the observed current is less than a first current level for a corresponding fundamental frequency, where the first current level is associated with the TDH threshold level and where the observed modulation index is equal to or less than a threshold modulation index level. In an alternative embodiment, the data processor 264 or the mode controller 203 enables the inverter to use SVPWM if the observed current is less than a first current level for a corresponding fundamental frequency, where the first current level is associated with the THD threshold level (e.g., operational data points associated with THD line 413) and where the observed modulation index is equal to or less than a threshold modulation index level (e.g., 404) for fundamental frequencies less than a critical fundamental frequency that corresponds to an intersection of THD line 413 and modulation index line 404.

Figure 16:
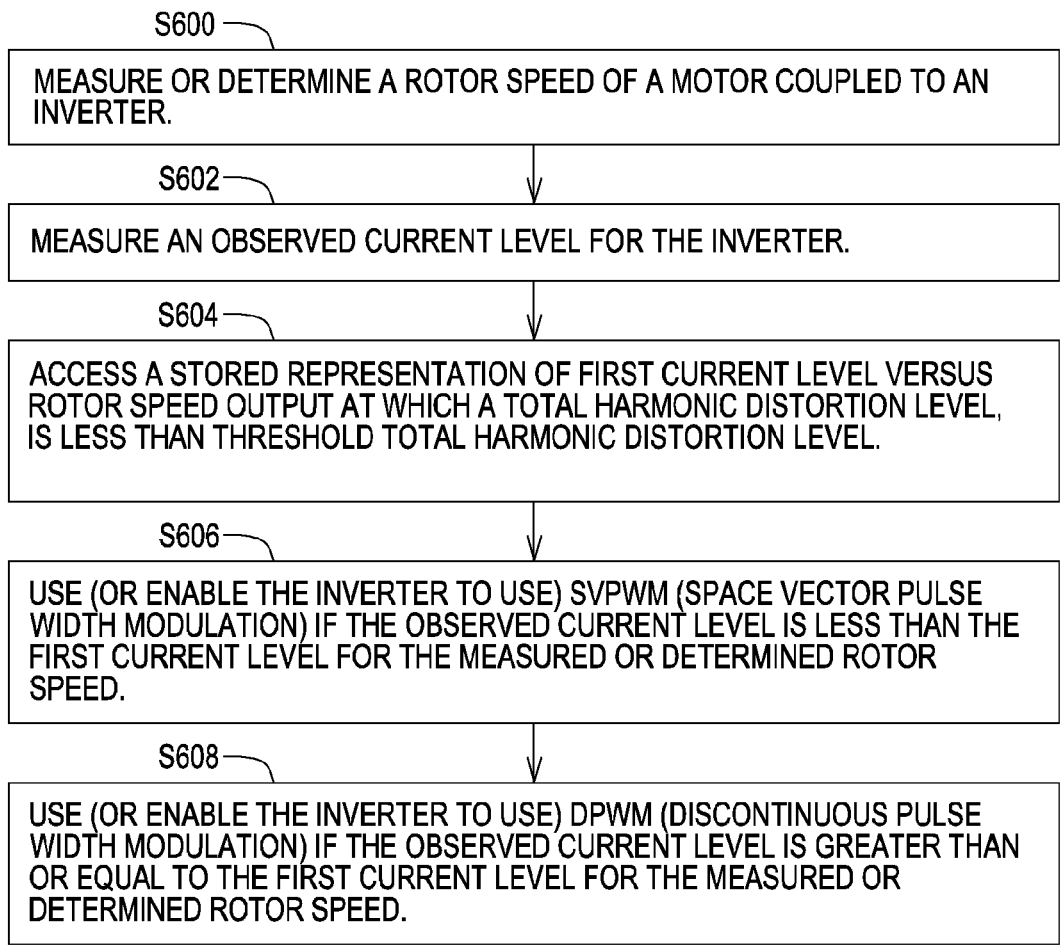
FIG. 16 is a flow chart of a seventh embodiment of a method for controlling a modulation mode of an inverter or a transition between a SVPWM mode and a DPWM mode based on rotor speed, among other things.

FIG. 16 is a flow chart of a seventh embodiment of a method for controlling a modulation mode of an inverter or a transition between a SVPWM mode and a DPWM mode based on rotor speed, among other things. FIG. 16 begins in step S600.

In step S600, an interface 205 receives or estimates a rotor speed of a motor coupled to an inverter. In one embodiment, a sensor 115 or primary processing module 114 may provide rotor speed data, on a motor coupled to the inverter, to the interface 205 for scaling, filtering or buffering in data storage (e.g., electronic memory). In an alternate embodiment, a sensor 115 or a primary processing module 114 may provide rotor speed data to a mode controller 203.

In step S502, a current measurement module 201 measures an observed current level for the inverter. The observed current may comprise one or more of the following electrical currents: a commanded current level (e.g., aggregate commanded current), a direct-axis commanded current $i_d^*$, a quadrature-axis commanded current $i_q^*$, a first phase current, a second phase current, a third phase current, a measured current of any phase output (e.g., $i_a$, $i_b$, $i_c$), an aggregate measured current that is a composite of multiple phases, a sum of a squared commanded direct-axis current and a squared commanded quadrature axis current, or a digital representation of any of the foregoing currents.

In step S604, a data processor 264 or mode controller 203 accesses a stored representation 207 of a first current level versus rotor speed output at which a total harmonic distortion level is less than a threshold total harmonic distortion level while operating in DPWM (e.g., target total harmonic distortion level).

In step S606, the data processor 264 or the mode controller 203 uses, or enables the inverter to use, SVPWM if the observed current level is less than a first current level for the measured or determined rotor speed. Further, the data processor 264 or the mode controller 203 may use, or enable the inverter to use, SVPWM regardless of the observed current level if the rotor speed is lower than a low rotor speed threshold, which is generally the equivalent of the low fundamental frequency threshold that is intercepted by the vertical line 403 in FIG. 4.

In step S608, the data processor 264 or the mode controller 203 uses, or enables the inverter to use, DPWM if the observed current level is greater than or equal to the first current level for the measured or determined rotor speed. However, if a hysteresis is active, the mode controller 203 or data processor 264 further considers a first countervailing factor of hysteresis to oppose or inhibit the use of DPWM for an observed sampling period if the observed current level is greater than or equal to the first current level by less than a hysteresis amount for a sampling period and if the inverter is currently operating in the SPWM mode for an earlier sampling period substantially immediately prior to the observed sampling period.

In an alternate embodiment, the data processor 264 or the mode controller may be adapted to add a hysteresis band (e.g., in step S606, step S608, or both) associated with the stored representation of the THD to prevent unwanted transitions between the SVPWM mode and the DPWM mode. Further, the hysteresis may be activated when the transition might otherwise exceed a certain target transition speed or exceed a certain target frequency of transitions.

Figure 17:
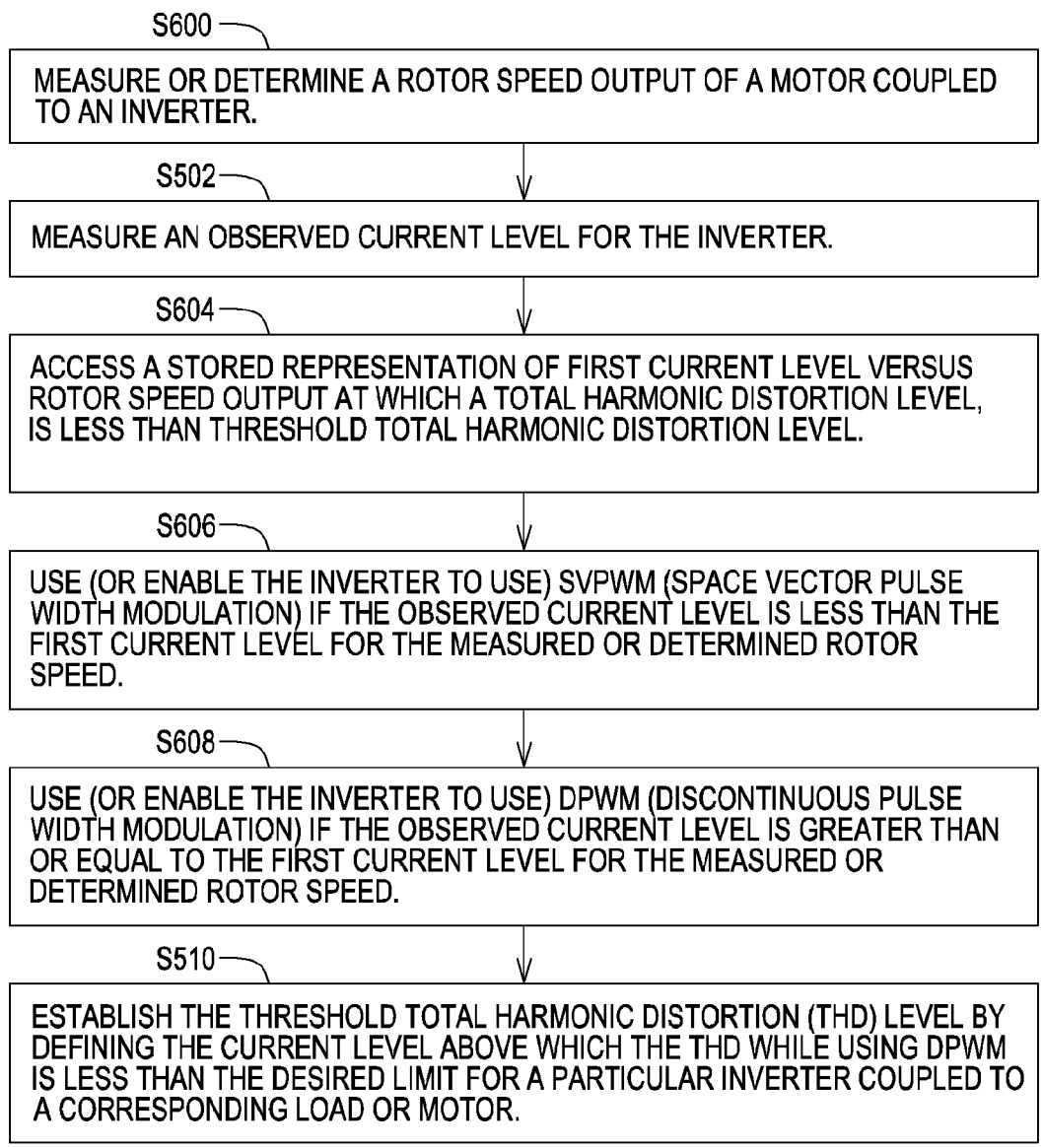
FIG. 17 is a flow chart of an eighth embodiment of a method for controlling a modulation mode of an inverter or a transition between a SVPWM mode and a DPWM mode.

FIG. 17 is a flow chart of an eighth embodiment of a method for controlling a modulation mode of an inverter or a transition between a SVPWM mode and a DPWM mode. The method of FIG. 17 is similar to the method of FIG. 16, except the method of FIG. 17 further comprises step S510. Like reference numbers in FIG. 16 and FIG. 17 indicate like elements.

Steps S600, S502, S604 S606, and S608 are set forth above in conjunction with FIG. 17.

In step S510, which may be executed before, during, after any of the above steps (except for S508), a spectrum analyzer, another testing device, or the combination of a computer and a testing device, establishes a threshold total harmonic distortion (THD) level by defining the current level above which the THD while using DPWM is less than the desired limit for a particular inverter coupled to a corresponding load or motor. For example, the testing device coupled to a computer may be programmed to compare the measured amplitude of the fundamental frequency to the measured amplitude of one or more harmonic frequencies to estimate the total harmonic distortion level. In one configuration, a testing device or total harmonic distortion measurement device is coupled to the output of the inverter when the inverter is electrically coupled to a motor, generator, electrical machine or equivalent electrical load. An equivalent electric load means a load that has resistance, inductance, reactance, reluctance, and back electromotive force (EMF) attributes similar to those of motor that is matched to the inverter characteristics.

Figure 18:
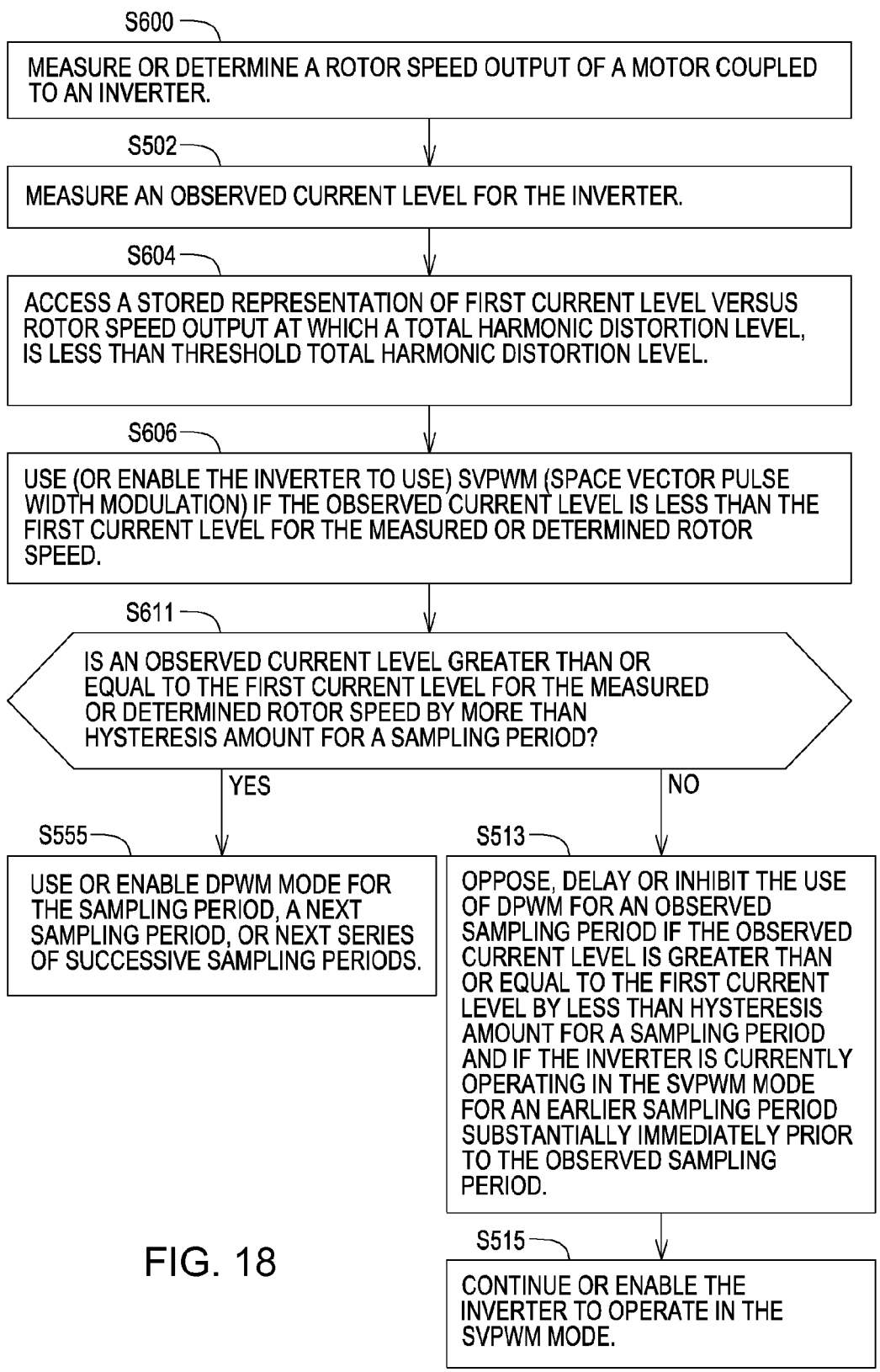
FIG. 18 is a flow chart of a ninth embodiment of a method for controlling a modulation mode of an inverter or a transition between a SVPWM mode and a DPWM mode.

FIG. 18 is a flow chart of a ninth embodiment of a method for controlling a modulation mode of an inverter or a transition between a SVPWM mode and a DPWM mode. The method of FIG. 18 is similar to the method of FIG. 16, except the method of FIG. 18 replaces step S608 with one or more of the following possible steps: S611, S555, S513 and S515. Like reference numbers in FIG. 16 and FIG. 18 indicate like elements.

Steps S600, S502, S604, and S606 are set forth above in conjunction with FIG. 16. Step S611 may be executed after or during S606 of the above steps of FIG. 18. In step S611, the data processor 264 or mode controller 203 determines whether or not the observed current level is greater than or equal to the first current level for the measured or determined rotor speed, of a motor coupled to the inverter, by more than hysteresis amount for a sampling period. If the observed current level is greater than or equal to the first measured current level, the method continues with step S555. However, if the observed current level is less than the first measured current level than the method continues with step S513.

In step S555, if the observed current level is greater than the first current level by equal to or more than the hysteresis amount for the sampling period, the controller may enable or activate the DPWM mode for the sampling period, a next sampling period, or next series of successive sampling periods.

In step S513, the data processor 264 or mode controller 203 opposes, delays or inhibits the use of the DPWM for an observed sampling period if the observed current level is greater than or equal to the first current level by less than hysteresis amount for a sampling period and if the inverter is currently operating in the SVPWM mode for an earlier sampling period substantially immediately prior to the observed sampling period.

In step S515, the data processor 264 or mode controller 203 continues or enables the inverter to operate in the SVPWM mode. For example, the data processor 264 or mode controller 203 continues or enables the inverter to operate in the SVPWM mode until the observed current level is greater than or equal to the first current level by more than or equal to a hysteresis amount for a later or next sampling period.

Figure 19:
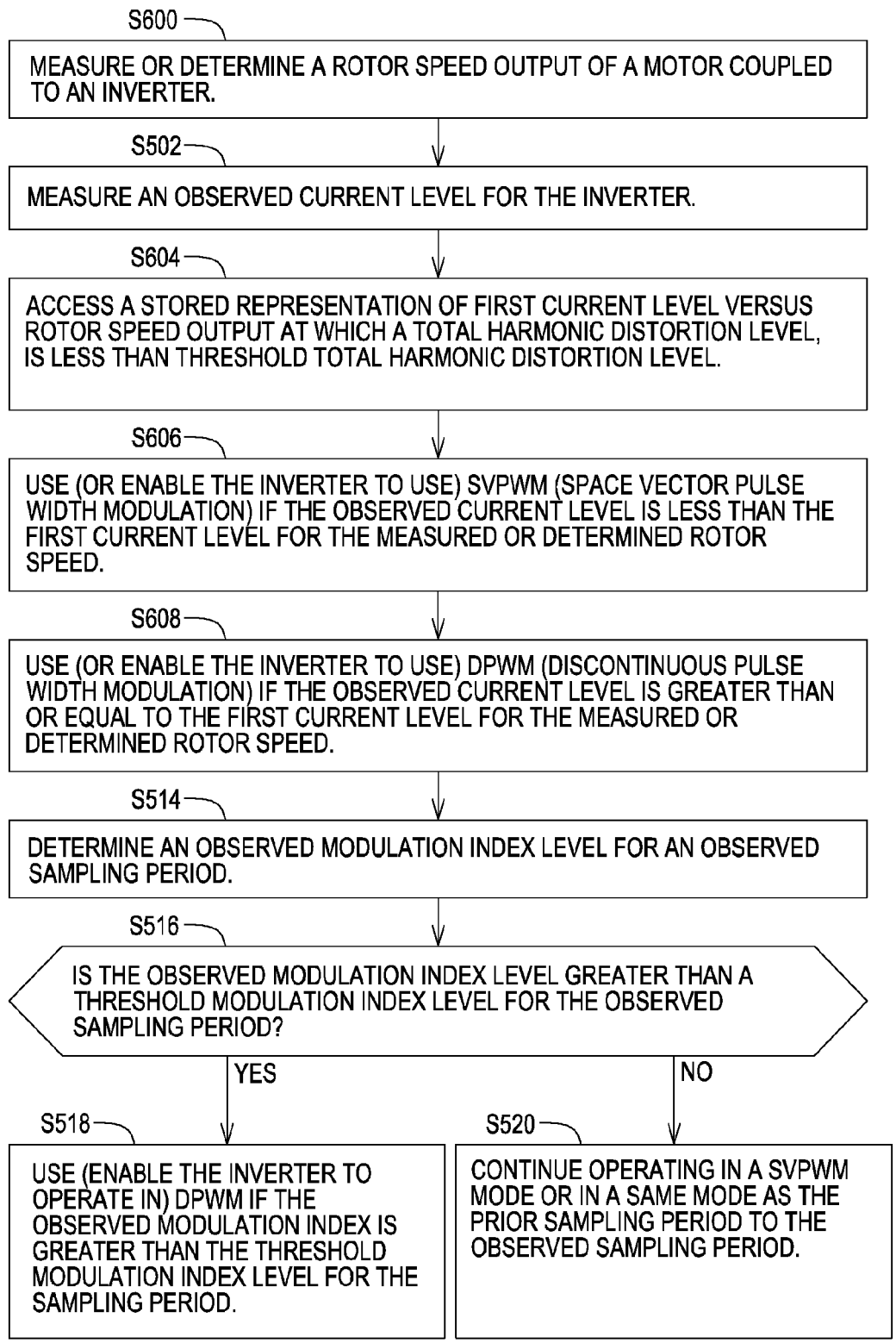
FIG. 19 is a flow chart of a tenth embodiment of a method for controlling a modulation mode of an inverter or a transition between a SVPWM mode and a DPWM mode.

FIG. 19 is a flow chart of a tenth embodiment of a method for controlling a modulation mode of an inverter or a transition between a SVPWM mode and a DPWM mode. The method of FIG. 19 is similar to the method of FIG. 16, except the method of FIG. 19 comprises additional steps with step S514, S516, S518 and S520. Like reference numbers in FIG. 16 and FIG. 19 indicate like elements.

Steps S600, S502, S604, S606 and S608 are set forth above in conjunction with FIG. 16. Step S514 may be executed after any of the above steps of FIG. 13. In step S514, a modulation index module 209 determines an observed modulation index level for an observed sampling period of the inverter. In a first configuration, the modulation index is defined based on the active switching time for each inverter phase divided by the total switching period for that inverter phase, where the modulation index is generally equal to or between 0 and 1. In a second configuration, the modulation index is defined based on the amplitude of the direct-axis voltage and the amplitude of the quadrature-axis voltage (e.g., available at the output of the current regulation controller 209), where the modulation index is generally equal to or between 0 and 1 except where over-modulation is used and the modulation index exceeds 1. In a third configuration, the modulation index level threshold comprises a generally constant value that is associated with the observed current that decreases with increasing fundamental frequency or increasing rotor speed of a motor coupled to the inverter.

In step S516, the modulation index module 209, the mode controller 203 or the data processor 264 determines whether or not the observed modulation index level is greater than a threshold modulation index level for the observed sampling period. If the observed modulation index level is greater than the threshold modulation index level, the method continues with step S518. However if the observed modulation index level is less than or equal to the threshold modulation index level, the method continues with step S510.

In step S518, the data processor 264 or mode controller 203 uses, or enables the inverter to operate in, DPWM. Step S518 may be executed in accordance with various techniques that may be applied separately or cumulatively. Under a first technique, the data processor 264 or mode controller 203 uses, or enables the inverter to operate in, DPWM if hysteresis is inactive (e.g., by the data processor 264 or the mode controller 203).

Under a second technique, the data processor 264 or the mode controller 203 enables of the inverter to use DPWM further considers a countervailing factor (e.g., second countervailing factor) of hysteresis to oppose or inhibit the use of DPWM for an observed sampling period if hysteresis is active, if the observed modulation index is greater than the threshold modulation index level by less than a hysteresis amount for a sampling period, and if the inverter is currently operating in the SPWM mode for an earlier sampling period substantially immediately prior to the observed sampling period.

Under a third technique, the data processor 264 or the mode controller 203 enables of the inverter to use DPWM, independent of or regardless of whether or not the observed current level is greater than or equal to the first current level for the measured or determined fundamental frequency. Under the third technique, the data processor 264 or mode controller 203 is programmed, has software instructions, or has logic where step S508 (e.g., of FIG. 10) can be overridden or superseded by step S518.

Under a fourth technique, the data processor 264 or the mode controller 203 enables of the inverter to use DPWM, independent of or regardless of whether or not the observed current level is greater than or equal to the first current level for the measured or determined fundamental frequency consistent with the THD boundary 404 in FIG. 4.

In step S520, the data processor 264 or mode controller 203 continues operating the inverter in a SVPWM mode or in a same mode as the prior sampling period to the observed sampling period.

Figure 20:
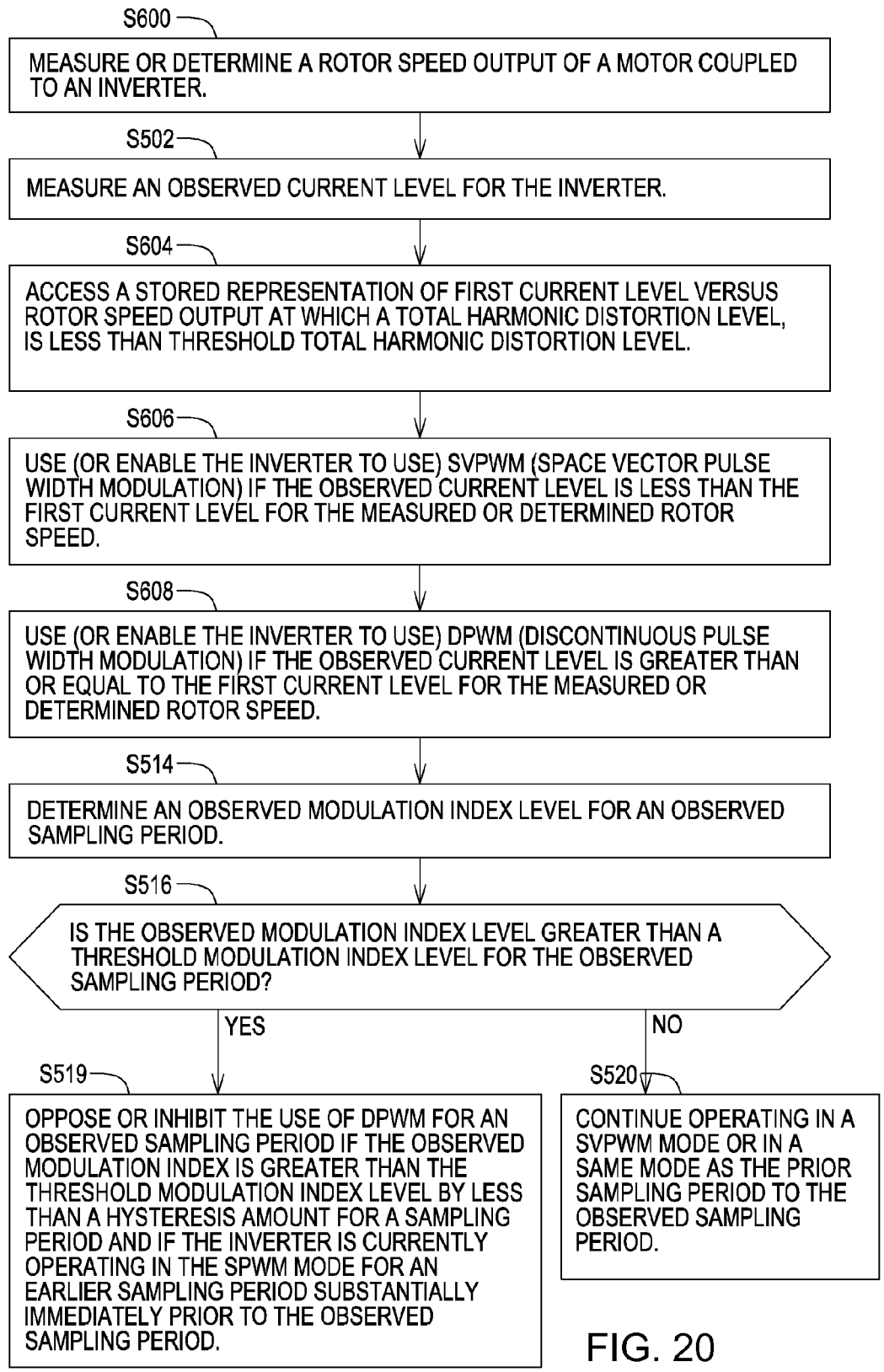
FIG. 20 is a flow chart of an eleventh embodiment of a method for controlling a modulation mode of an inverter or a transition between a SVPWM mode and a DPWM mode.

FIG. 20 is a flow chart of an eleventh embodiment of a method for controlling a modulation mode of an inverter or a transition between a SVPWM mode and a DPWM mode. The method of FIG. 20 is similar to the method of FIG. 19 except the method of FIG. 20 replaces step S518 with step S519. Like reference numbers in FIG. 19 and FIG. 20 indicate like steps, methods or procedures.

In step S516 of FIG. 20, the modulation index module 209, the mode controller 203 or the data processor 264 determines whether or not the observed modulation index level is greater than a threshold modulation index level for the observed sampling period. If the observed modulation index level is greater than the threshold modulation index level, the method continues with step S519. However if the observed modulation index level is less than or equal to the threshold modulation index level, the method continues with step S520.

In step S519, the data processor 264 or the mode controller 203 opposes, delays or inhibits the use of DPWM for an observed sampling period if the observed modulation index is greater than the threshold modulation index level by less than a hysteresis amount for a sampling period and if the inverter is currently operating in the SVPWM mode for an earlier sampling period substantially immediately prior to the observed sampling period. After step S519, the method continues with step S520 or step S520 may follow step S516 as indicated above.

In step S520, the data processor 264 or mode controller 203 continues operating the inverter in a SVPWM mode or in a same mode as the prior sampling period to the observed sampling period.

Figure 21:
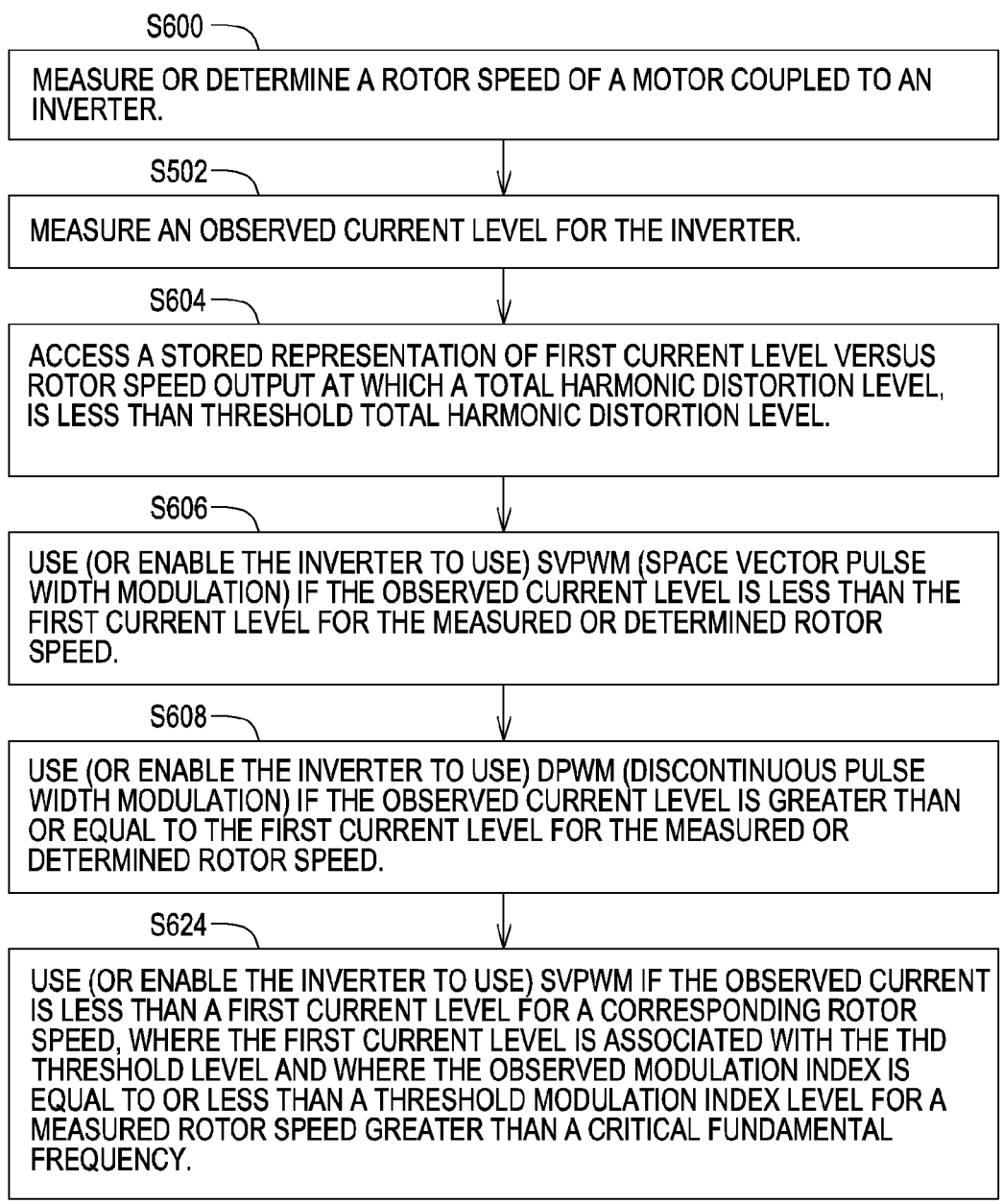
FIG. 21 is a flow chart of a twelfth embodiment of a method for controlling a modulation mode of an inverter or a transition between a SVPWM mode and a DPWM mode.

FIG. 21 is a flow chart of a twelfth embodiment of a method for controlling a modulation mode of an inverter or a transition between a SVPWM mode and a DPWM mode. The method of FIG. 21 is similar to the method of FIG. 16, except the method of FIG. 21 further comprises step S524. Like reference numbers in FIG. 16 and FIG. 21 indicate like elements.

Steps S600, S502, S604, S606 and S608 are set forth above in conjunction with FIG. 16. Step S524 may be executed after any step in FIG. 21. In step S524, the data processor 264 or mode controller 203 uses or enables the inverter to use, SVPWM if the observed current is less than a first current level for a corresponding fundamental frequency, where the first current level is associated with the TDH threshold level and where the observed modulation index is equal to or less than a threshold modulation index level for fundamental frequencies greater than a critical fundamental frequency, or an equivalent critical rotor speed of the motor coupled to the inverter.

Having described the preferred embodiment, it will become apparent that various modifications can be made without departing from the scope of the invention as defined in the accompanying claims.

The following is claimed:

1. A method for controlling an inverter, the method comprising:

measuring or determining, by an interface, a fundamental frequency output of at least one phase output of the inverter;

measuring, by a current measurement module, an observed current level for the inverter;

accessing, by a data processor, a stored representation of first current level versus fundamental frequency output at which a total harmonic distortion level, is less than threshold total harmonic distortion level;

enabling, by a mode controller, the inverter to use SVPWM (space vector pulse width modulation) if the observed current level is less than the first current level for the measured or determined fundamental frequency; and enabling, by the mode controller, the inverter to use DPWM (discontinuous pulse width modulation) if the observed current level is greater than or equal to the first current level for the measured or determined fundamental frequency, wherein the enabling of the inverter to use DPWM further considers a first countervailing factor of hysteresis to oppose or inhibit the use of DPWM for an observed sampling period if the observed current level is greater than or equal to the first current level by less than a hysteresis amount for a sampling period and if the inverter is currently operating in the SPWM mode for an earlier sampling period substantially immediately prior to the observed sampling period.

2. The system according to claim 1 further comprising:
establishing the threshold total harmonic distortion (THD) level by defining the current level above which the THD while using DPWM is less than the desired limit for a particular inverter coupled to a corresponding load or motor.

3. The method according to claim 1 wherein in the measuring or determining of the fundamental frequency, the determined fundamental frequency is derived from a rotor speed of the motor.

4. The method according to claim 1 further comprising:
determining an observed modulation index level for a sampling period; and
determining whether the observed modulation index level is greater than a threshold modulation index level for the sampling period; and
enabling the inverter to operate in the DPWM mode if the observed modulation index is greater than the threshold modulation index level for the sampling period.

5. The method according to claim 4 wherein the enabling of the inverter to use DPWM further considers a second countervailing factor of hysteresis to oppose or inhibit the use of DPWM for an observed sampling period if the observed modulation index is greater than the threshold modulation index level by less than a hysteresis amount for a sampling period and if the inverter is currently operating in the SPWM mode for an earlier sampling period substantially immediately prior to the observed sampling period.

6. The method according to claim 4 wherein the modulation index is defined based on the active switching time for each inverter phase divided by the total switching period for that inverter phase, where the modulation index is generally equal to or between 0 and 1.

7. The method according to claim 4 wherein the modulation index is defined based on the amplitude of the direct axis voltage and the amplitude of the quadrature axis voltage.

8. The method according to claim 4 wherein the modulation index level threshold comprise a generally constant value that is associated with the observed current that decreases with increasing fundamental frequency.

9. The method according to claim 1 further comprising:
enabling the inverter to use SVPWM if the fundamental frequency is lower than threshold fundamental frequency.

10. The method according to claim 1 further comprising:
enabling the inverter to use SVPWM if the observed current is less than a first current level for a corresponding fundamental frequency, where the first current level is associated with the THD threshold level and where the observed modulation index is equal to or less than a threshold modulation index level.

11. The method according to claim 1 further comprising:
transitioning from an existing operational mode to a new operational mode, where the existing operational mode and the new operational mode are selected from the group of operating modes consisting of SVPWM and DPWM based on the determined fundamental frequency, an estimated THD level associated with a stored representation for a corresponding current and fundamental frequency, and the observed modulation index.

12. The method according to claim 1 wherein the stored representation comprises a linear equation, a quadratic equation, a curve, a region, an area, a set of data points, a look-up table, a database or a file that is established:
during a characterization process, operating the inverter in a DPWM mode;
during a DPWM mode at each fundamental frequency, determining a current level at which the total harmonic distortion is less than a threshold level to produce the representation.

13. The method according to claim 12 wherein the total harmonic distortion level is less than or equal to approximately ten percent total harmonic distortion.

14. The method according to claim 1 further comprising:
adding a hysteresis band associated with the representation to prevent transitioning between the SVPWM and the DPWM that exceeds a target transition speed.

15. The method according to claim 1 wherein the observed current comprises one or more of the following electrical currents: a commanded current level, an aggregate current derived from direct axis current and quadrature axis current, or a first phase current, a second phase current, and a third phase current, digital representations of any of the foregoing currents.

16. A system for controlling an inverter, the system comprising:
an interface for measuring or determining a fundamental frequency output of at least one phase output of the inverter;
a current measurement module for measuring an observed current level for the inverter;
a data processor for accessing a stored representation in a data storage device, the stored representation providing total harmonic distortion characterization data associated with a first current level versus fundamental frequency output at which the total harmonic distortion level at an inverter output, is less than threshold total harmonic distortion level while operating in DPWM;
a mode controller for enabling the inverter to use SVPWM (space vector pulse width modulation) if the observed current level is less the first current level for the measured fundamental frequency; and
a mode controller for enabling the inverter to use DPWM (discontinuous pulse width modulation) if the observed current level is greater than the first current level for the measured fundamental frequency, wherein the enabling of the inverter to use DPWM further considers a first countervailing factor of hysteresis to oppose or inhibit the use of DPWM for an observed sampling period if the observed current level is greater than or equal to the first current level by less than a hysteresis amount for a sampling period and if the inverter is currently operating in the SPWM mode for an earlier sampling period substantially immediately prior to the observed sampling period.

17. The system according to claim 16 further comprising:
a modulation index module for providing an observed modulation index level; and
a mode controller or data processor for determining whether an observed modulation index level is greater than a threshold modulation index level.

18. The system according to claim 16 wherein the threshold total harmonic distortion level is set by defining the current level above which the THD while using DPWM is less than the desired limit.

19. The system according to claim 16 wherein the observed current level comprises commanded current.

20. A system for controlling an inverter, the method comprising:
an interface for measuring or determining a fundamental frequency output of at least one phase output of the inverter;
a first current sensor for measuring a first commanded current level for the direct axis current;
a second current sensor for measuring a second commanded current level for the quadrature axis current;
a summer for adding a square of the first commanded current level to a square of the second commanded current level to obtain an aggregate commanded current level;
a data processor for accessing a stored representation of minimum current level versus fundamental frequency output at which the total harmonic level is less than threshold level, the minimum current level comprising commanded current level squared;
a data stored device for storing the representation;
a mode controller for enabling the inverter to use SVPWM is the commanded current level is less than the minimum current level for the measured fundamental frequency; and
the mode controller adapted to enable the inverter to use DPWM if the commanded current level is greater than or equal to the minimum current level for the measured fundamental frequency, wherein the enabling of the inverter to use DPWM further considers a first countervailing factor of hysteresis to oppose or inhibit the use of DPWM for an observed sampling period if the observed current level is greater than or equal to the first current level by less than a hysteresis amount for a sampling period and if the inverter is currently operating in the SPWM mode for an earlier sampling period substantially immediately prior to the observed sampling period.

* * * * *